(12) United States Patent
Siess et al.

(10) Patent No.: US 12,196,614 B2
(45) Date of Patent: Jan. 14, 2025

(54) METHOD OF CHARACTERIZING AN OPTICAL SENSOR CHIP, METHOD OF CALIBRATING AN OPTICAL SENSOR CHIP, METHOD OF OPERATING AN OPTICAL SENSOR DEVICE, OPTICAL SENSOR DEVICE AND CALIBRATION SYSTEM

(71) Applicant: ams Sensors Germany GmbH, Jena (DE)

(72) Inventors: Gunter Siess, Jena (DE); Julius Komma, Jena (DE); Thomas Höppler, Jena (DE); Thomas Nimz, Jena (DE); Mahmoud Jazayerifar, Jena (DE)

(73) Assignee: AMS SENSORS GERMANY GMBH, Jena (DE)

( * ) Notice: Subject to any disclaimer, the term of this patent is extended or adjusted under 35 U.S.C. 154(b) by 522 days.

(21) Appl. No.: 17/312,999

(22) PCT Filed: Oct. 30, 2019

(86) PCT No.: PCT/EP2019/079699
§ 371 (c)(1),
(2) Date: Jun. 11, 2021

(87) PCT Pub. No.: WO2020/120003
PCT Pub. Date: Jun. 18, 2020

(65) Prior Publication Data
US 2022/0065695 A1   Mar. 3, 2022

(30) Foreign Application Priority Data
Dec. 14, 2018   (EP) .................................... 18212716

(51) Int. Cl.
*G01J 3/02* (2006.01)
*G01J 1/02* (2006.01)
*G01J 3/28* (2006.01)

(52) U.S. Cl.
CPC ........... *G01J 3/0275* (2013.01); *G01J 1/0252* (2013.01); *G01J 3/2803* (2013.01); *G01J 3/0256* (2013.01)

(58) Field of Classification Search
CPC ...... G01J 3/0275; G01J 1/0252; G01J 3/2803; G01J 3/0256
See application file for complete search history.

(56) References Cited

U.S. PATENT DOCUMENTS

| 5,266,792 A | * | 11/1993 | Crowne | G01J 9/00 250/226 |
| 2007/0035740 A1 | * | 2/2007 | Nisper | G01J 3/10 356/446 |

(Continued)

FOREIGN PATENT DOCUMENTS

| CA | 2929624 A1 | 11/2017 |
| DE | 10018940 A1 | 10/2001 |

OTHER PUBLICATIONS

International Search Report and Written Opinion mailed Jan. 29, 2020 for corresponding International Application No. PCT/EP2019/079699, 14 pages.

(Continued)

*Primary Examiner* — Lee E Rodak
*Assistant Examiner* — Sangkyung Lee
(74) *Attorney, Agent, or Firm* — MH2 Technology Law Group LLP

(57) ABSTRACT

Disclosed are methods and devices for calibration in the field of optical sensors, e.g. characterizing and calibrating an optical sensor chip. In order to address complexity of sensor data with high accuracy the optical sensor, e.g. an optical sensor is not provided as an already calibrated unit. Rather, sensor response data may be recorded in a defined or standardized environment, e.g. at a production line, and with high precision. This high standard sensor response data can (Continued)

be obtained on a per device basis and, thus, is referenced with an unambiguous chip identification number, chip ID. The sensor data is complemented with a dedicated calibration algorithm which can be tailor-made to fit the optical sensor or the optical sensor chip. In order to retrieve the sensor response data and the calibration algorithm both can be made available by means of the chip ID, for example.

13 Claims, 21 Drawing Sheets

(56) References Cited

U.S. PATENT DOCUMENTS

| | | | |
|---|---|---|---|
| 2007/0046941 A1 | 3/2007 | Mestha et al. | |
| 2011/0309755 A1* | 12/2011 | Wirth | H05B 45/20 |
| | | | 315/151 |
| 2012/0092650 A1* | 4/2012 | Gunn, III | G01N 356/73 |
| 2013/0261010 A1* | 10/2013 | Bailey | G01N 27/745 |
| | | | 422/69 |
| 2016/0245695 A1* | 8/2016 | Lee | G01J 3/462 |
| 2016/0249836 A1* | 9/2016 | Gulati | G01N 21/359 |
| | | | 600/316 |
| 2016/0299061 A1 | 10/2016 | Goldring et al. | |
| 2016/0349400 A1* | 12/2016 | Chen | G01V 8/02 |

OTHER PUBLICATIONS

Chinese Office Action issued in corresponding Chinese Patent Application No. 2019800827157 dated Dec. 4, 2023, with English language translation, 12 pages.

* cited by examiner

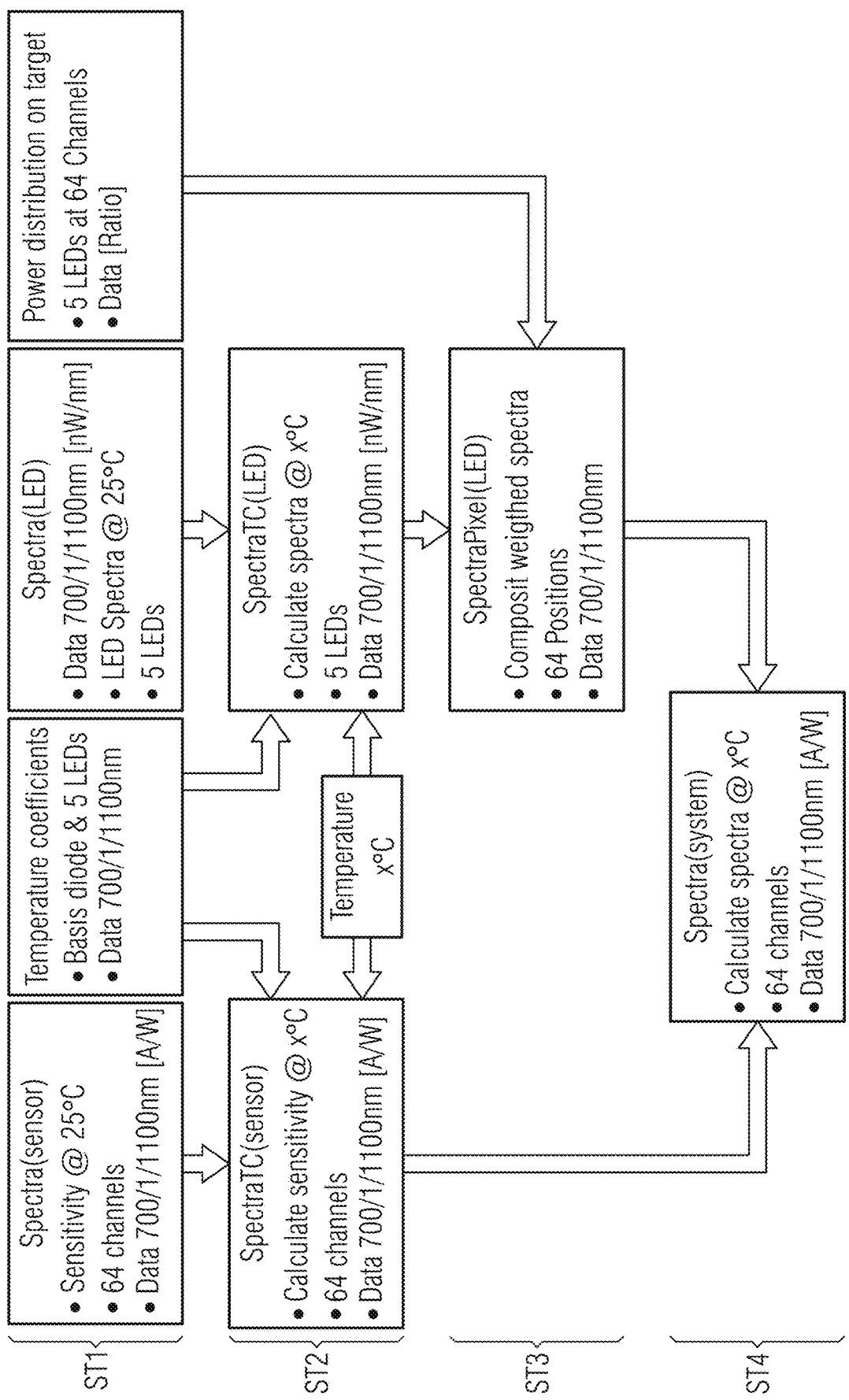

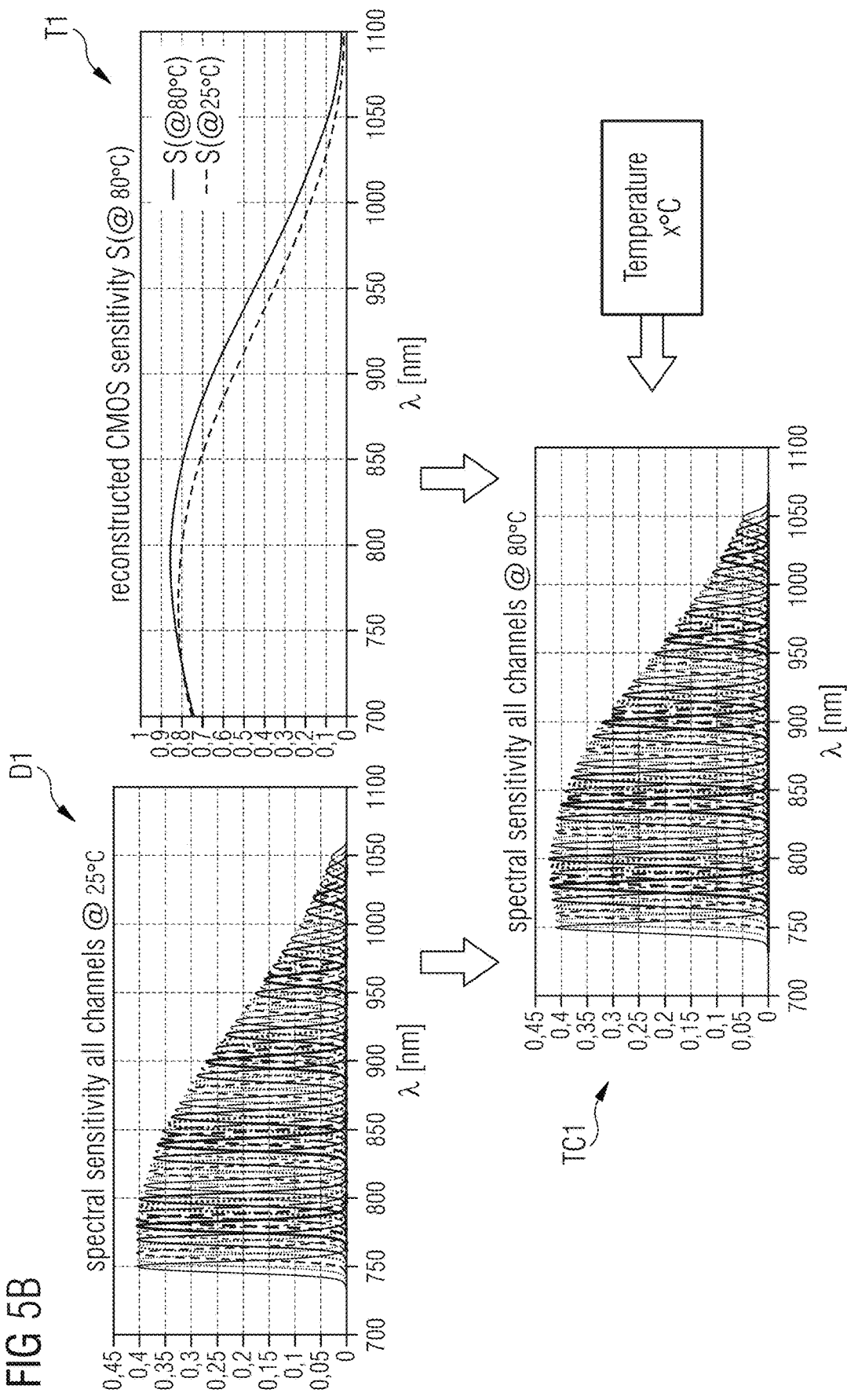

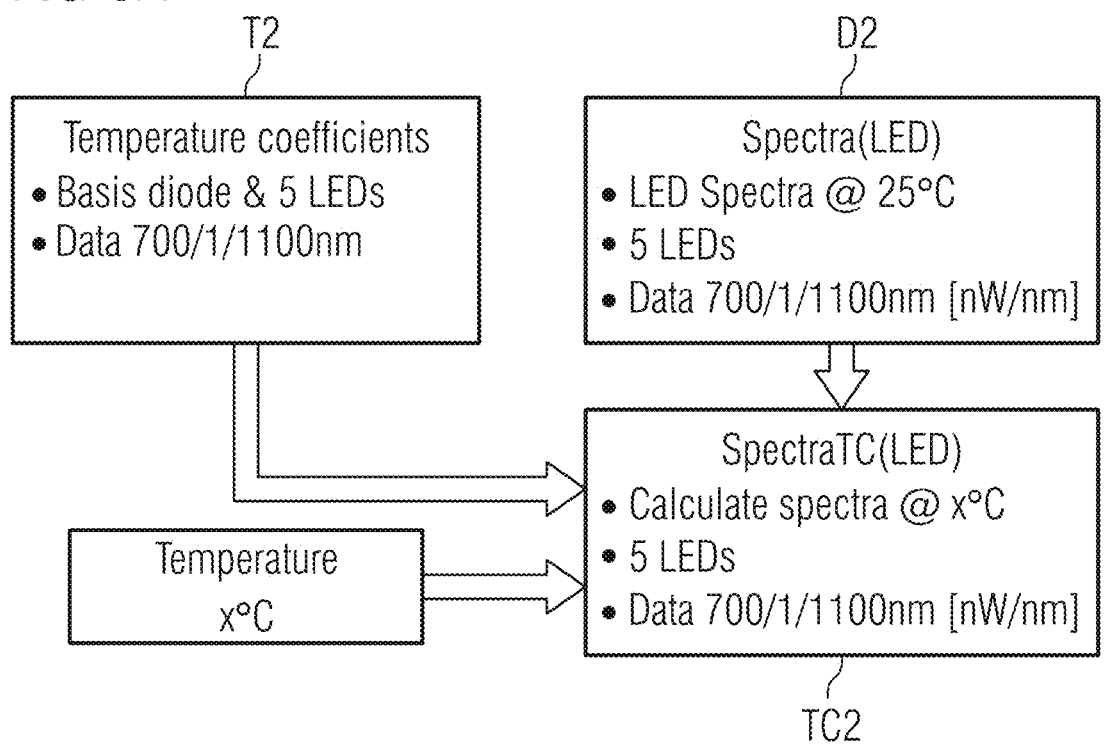

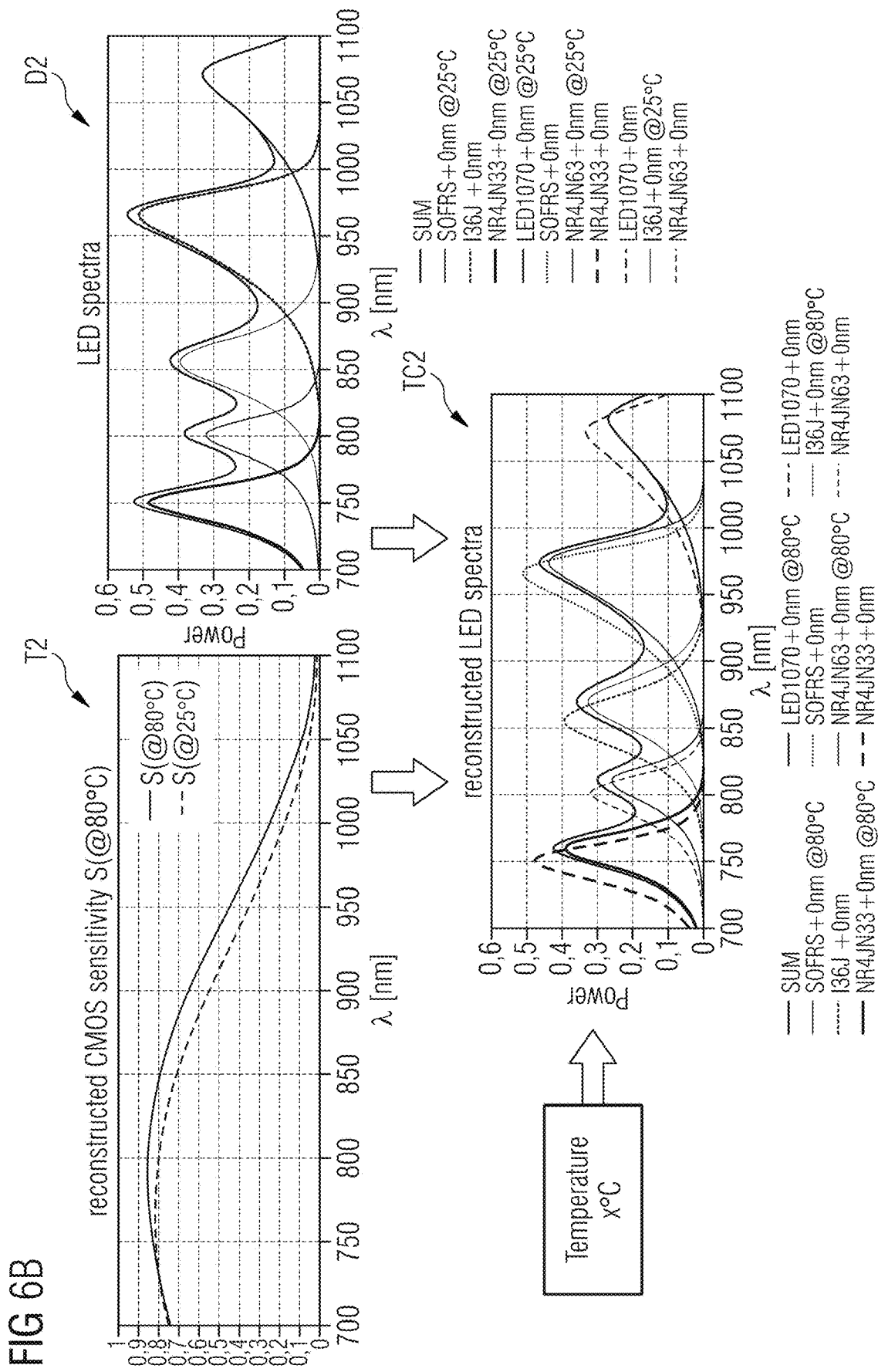

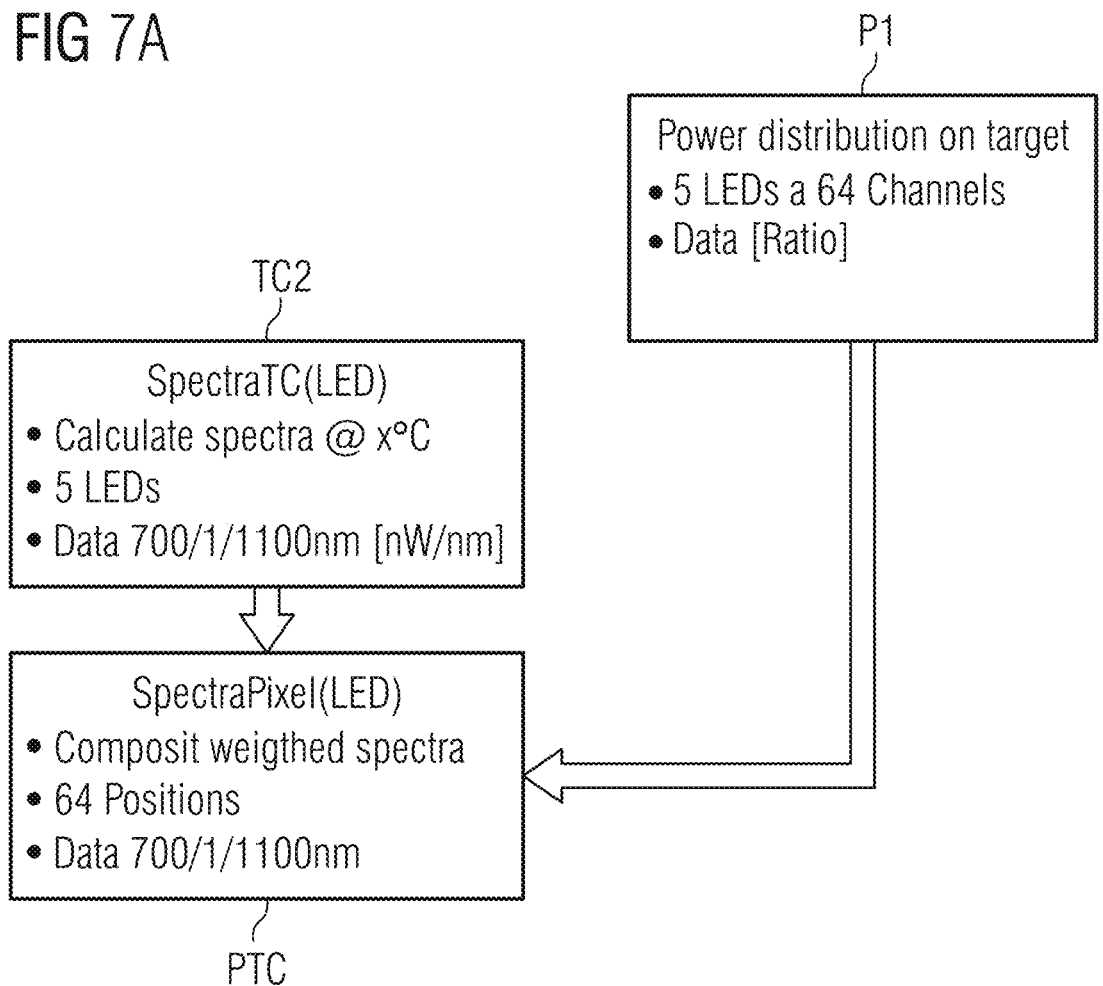

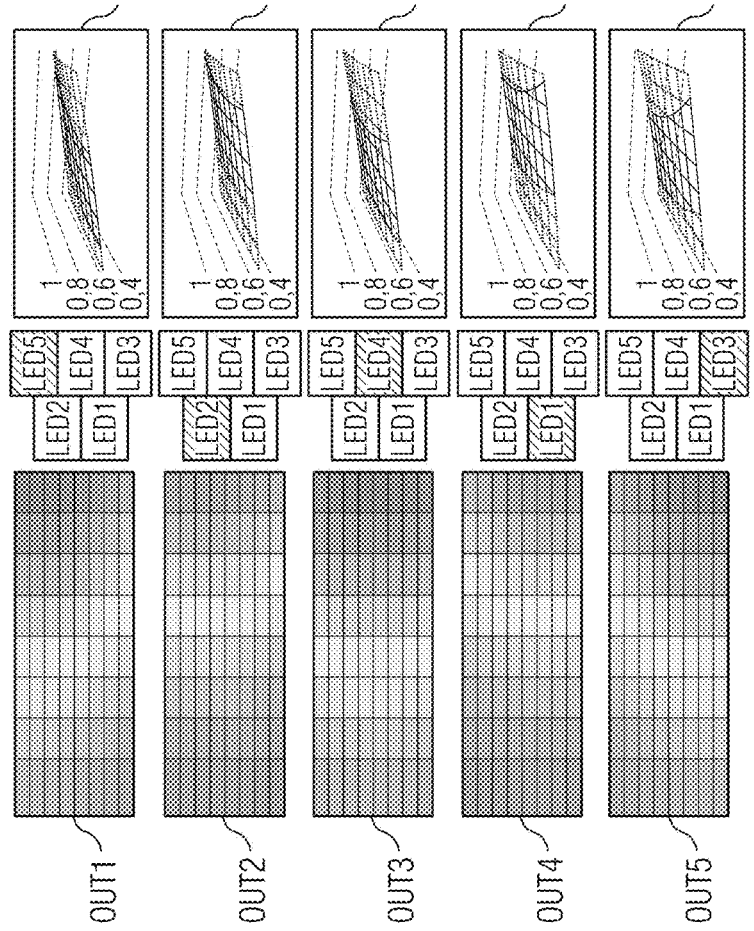

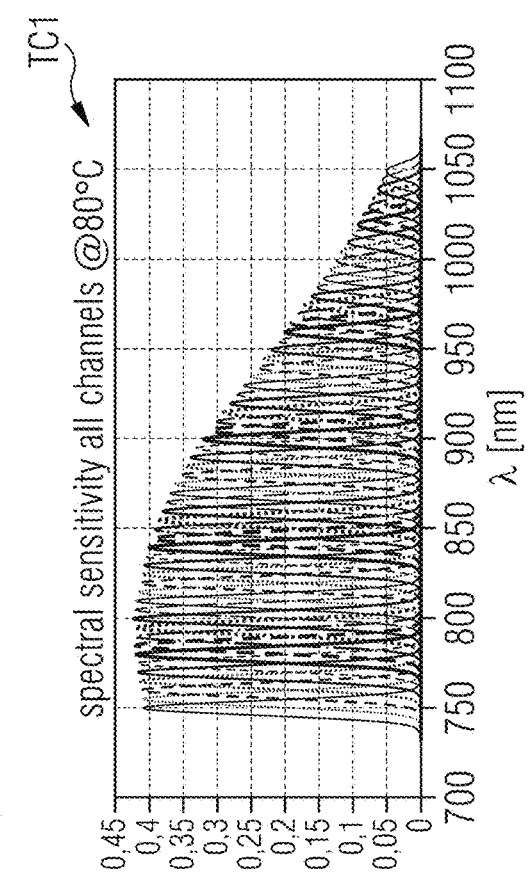

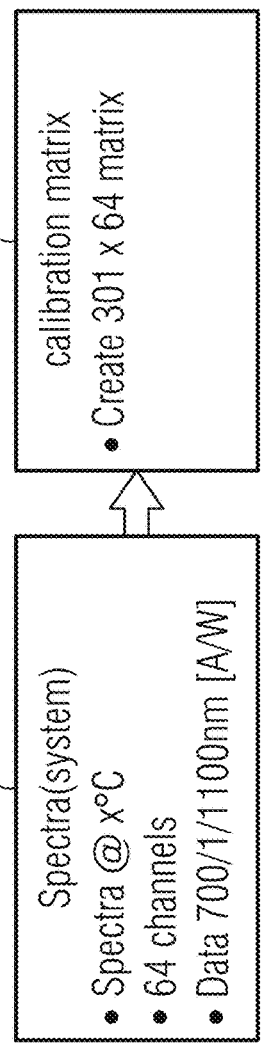
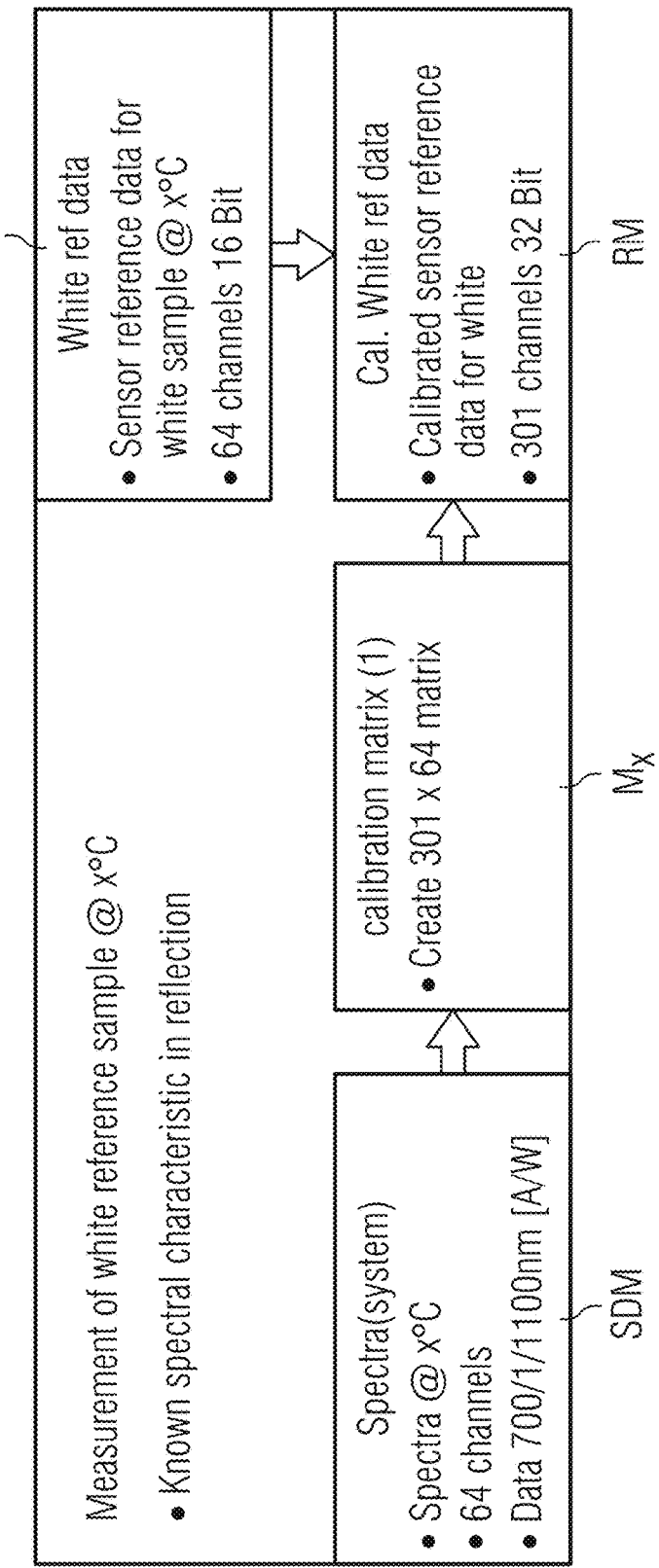

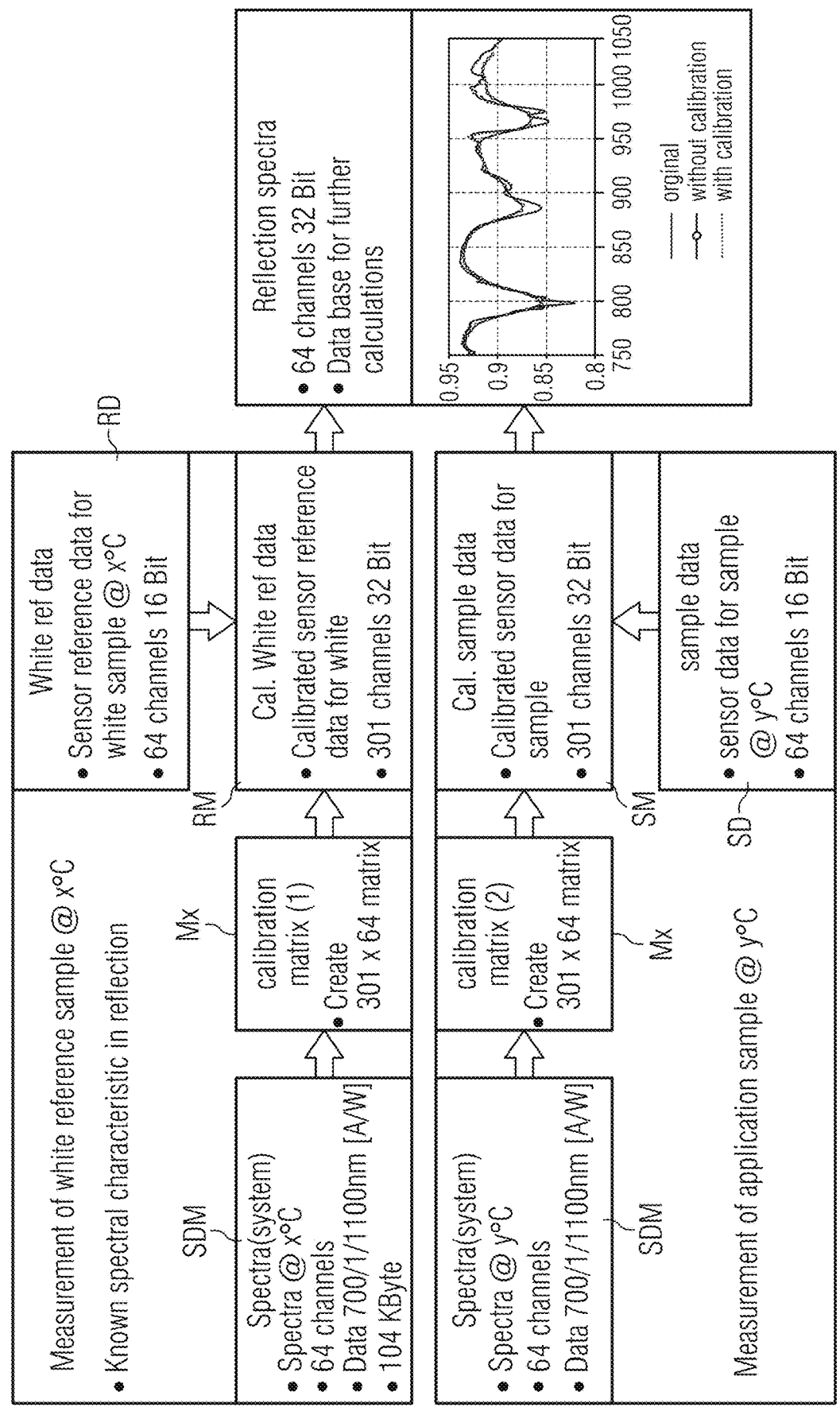

FIG 10
FIG 10A
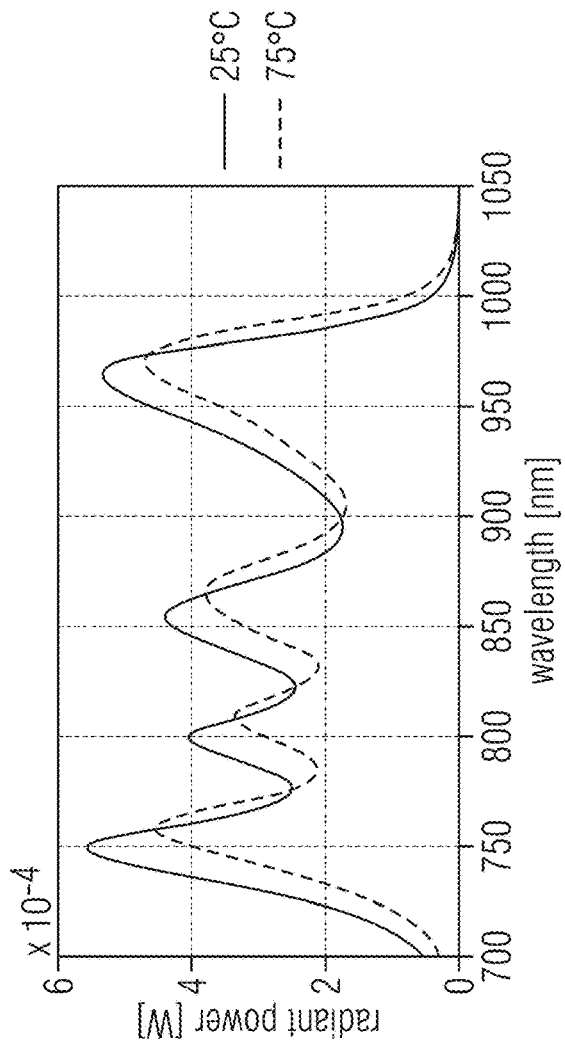
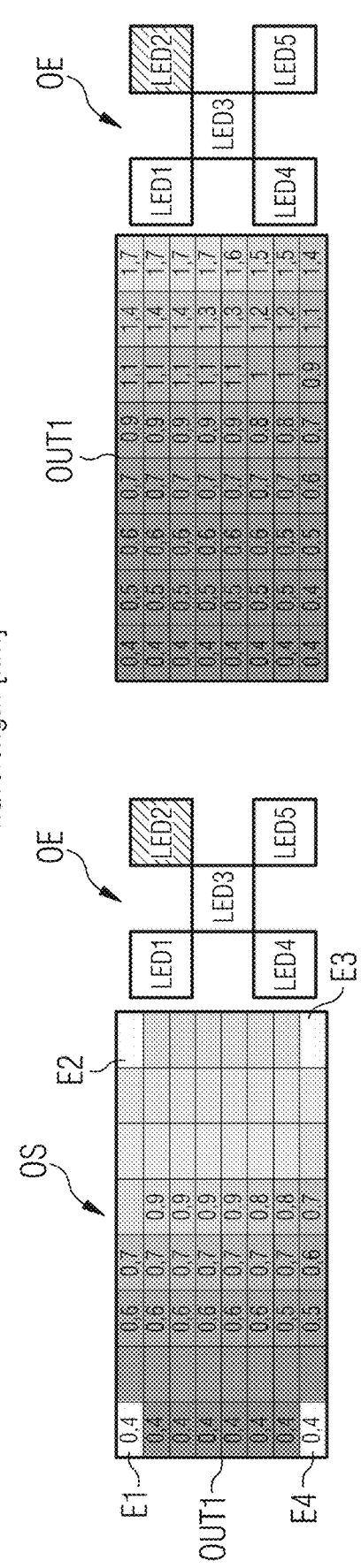

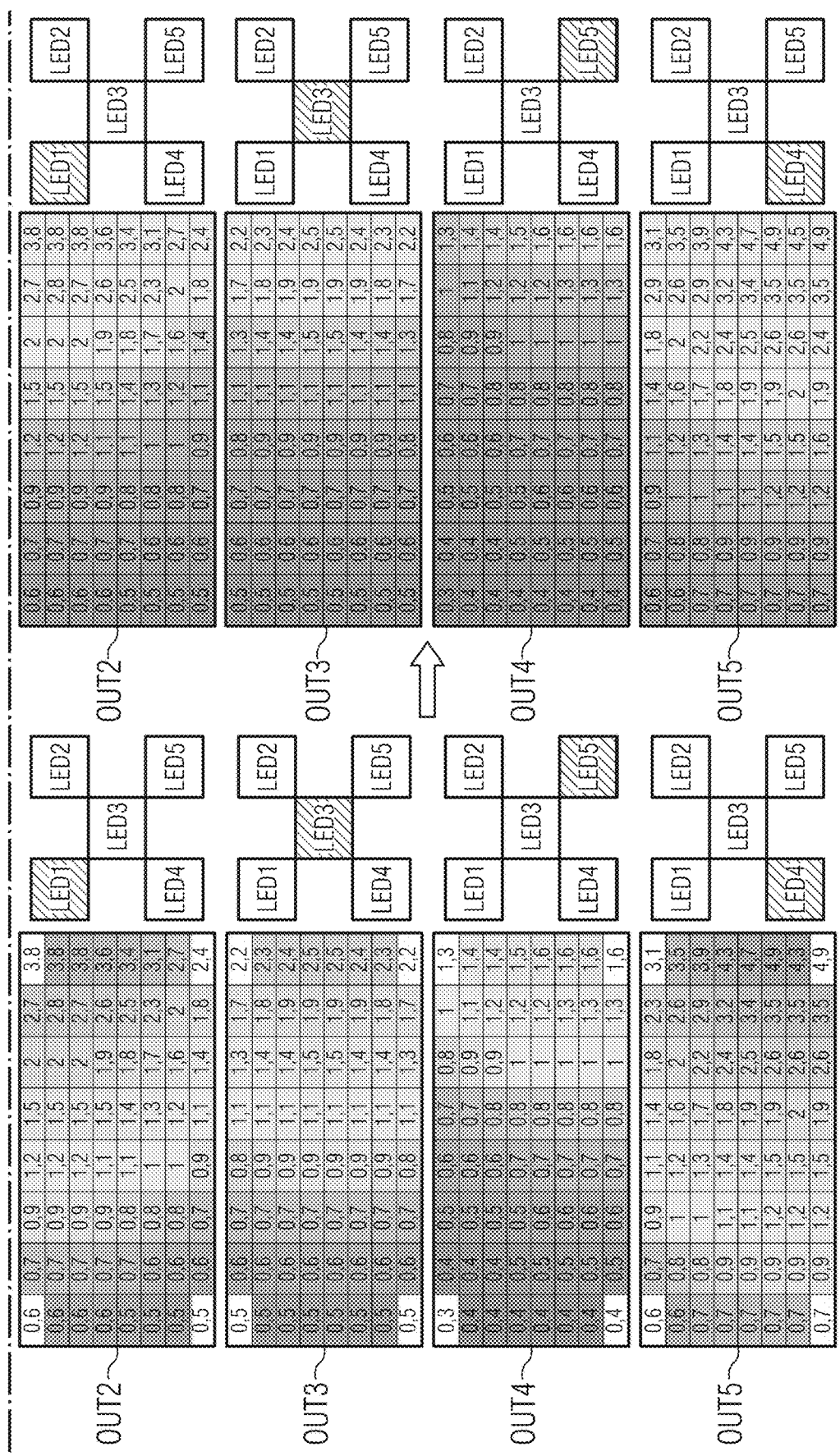

METHOD OF CHARACTERIZING AN OPTICAL SENSOR CHIP, METHOD OF CALIBRATING AN OPTICAL SENSOR CHIP, METHOD OF OPERATING AN OPTICAL SENSOR DEVICE, OPTICAL SENSOR DEVICE AND CALIBRATION SYSTEM

CROSS-REFERENCE TO RELATED APPLICATIONS

The present application is the national stage entry of International Patent Application No. PCT/EP2019/079699, filed on Oct. 30, 2019, and published as WO 2020/120003 A1 on Jun. 18, 2020, which claims the benefit of priority of European Patent Application No. 18212716.7, filed on Dec. 14, 2018, all of which are incorporated by reference herein in their entirety.

BACKGROUND OF THE DISCLOSURE

The following relates to methods of characterizing and calibrating an optical sensor chip, a method of operating an optical sensor device, an optical sensor device and a calibration system.

Optical sensors are increasingly being used in such diverse areas of technology as smart phones and mobile devices, smart homes and buildings, industrial automation, medical technology and connected vehicles, etc. At the same time sensor data becomes more complex and is expected to meet the requirements for high accuracy. In turn, calibration routines are applied in order to achieve calibrated sensor data which meets standardized output. However, accuracy of the sensor data largely depends on the calibration, e.g. quality of calibration data, parametrization, modelling, etc. Often there is a need for application specific parameters and methods.

SUMMARY OF THE DISCLOSURE

It is to be understood that any feature described hereinafter in relation to any one embodiment may be used alone, or in combination with other features described hereinafter, and may also be used in combination with one or more features of any other of the embodiments, or any combination of any other of the embodiments, unless explicitly described as an alternative. Furthermore, equivalents and modifications not described below may also be employed without departing from the scope of the method of characterizing an optical sensor chip, the method of calibrating an optical sensor chip, the method of operating an optical sensor device, the optical sensor device and the calibration system as defined in the accompanying claims.

The following relates to an improved concept in the field of optical sensors, e.g. characterizing and calibrating an optical sensor chip. In order to address complexity of sensor data with high accuracy the optical sensor, e.g. an optical sensor is not provided as an already calibrated unit. Rather, sensor response data may be recorded in a defined or standardized environment, e.g. at a production line, and with high precision. This high standard sensor response data can be obtained on a per device basis and, thus, is referenced with an unambiguous chip identification number, chip ID. The sensor data is complemented with a dedicated calibration algorithm which can be tailor-made to fit the optical sensor or the optical sensor chip. In order to retrieve the sensor response data and the calibration algorithm both can be made available by means of the chip ID, for example.

In at least one embodiment a method of characterizing an optical sensor chip comprises the following steps. First, the optical sensor chip is referenced with an unambiguous chip identification number, chip ID. For example, the optical sensor chip is manufactured at a production line and referenced with the chip ID during the process and at said production line. In some embodiments the optical sensor chip may comprise an onboard memory to save the chip ID. The onboard memory may be accessible via dedicated terminals or a sensor interface in order to read out the chip ID, e.g. by means of an optical sensor device, at a production site of a customer while the optical sensor chip is integrated into an optical device, or even during operation of an optical sensor device embedding the optical sensor chip. In other embodiments the chip ID may be printed on a package of the optical sensor chip or otherwise be provided as documentation or data when the optical sensor chip is shipped to the customer.

As a further step, the optical sensor chip is characterized by measuring sensor response data as a function of wavelength and as a function of an operating temperature. For example, the production line may be equipped with dedicated calibration facilities which provide a standardized and reproducible environment for characterizing the optical sensor chip. Characterizing the optical sensor chip may involve measuring the sensor response data at high resolution and for a number of wavelengths or a continuous range of wavelengths. Typically, the sensor response data is subject to changes with varying temperature. Thus, the sensor response data is measured for at least one defined temperature or a range of temperatures. Temperature dependency of the sensor response data can be recorded in a defined range of operating temperatures or simulated based on a mathematical modelling of the sensor response data dependency on temperature.

In a further step, the sensor response data is saved together with the chip ID as a databank entry in a database. There are several possibilities to save the sensor response data which may also involve different locations. For example, the database, including the chip ID and the sensor response data referenced with the chip ID, can be provided to the customer as a hard copy, e.g. as a memory unit such as a memory stick. However, it is possible to provide the database via a network such as the internet or a cloud service. For example, the sensor response data is saved on a server associated with the production site and can be accessed as a cloud solution from or by the customer with direct assignment via the chip ID.

Finally, a calibration algorithm is provided which is associated with the chip ID. For example, the calibration algorithm is provided to the customer as a software or firmware associated with the individual optical sensor chip via its chip ID. This can be done by the same technical means used for saving and accessing the sensor response data. However, the calibration algorithm can also be provided by means of a white paper which describes a way to compensate and calibrate the sensor data. Furthermore, providing the calibration algorithm can also be left completely to the customer who may use the calibration algorithm provided by the producer and adjust the algorithm to fit their specific needs. Or the customer comes up with a calibration algorithm on its own which suits his needs and applications. In this sense the calibration algorithm is provided by the producer and/or by the customer.

Characterizing the optical sensor chip using the sensor response data and chip ID proposed above allows for using highly accurate data which has been recorded in a controlled laboratory environment. The production site may provide the necessary facilities to obtain such data, including controlled, standardized environment such as standard light sources, monochromators, defined temperatures, cleanroom, etc. Furthermore, as the sensor response data can be recorded for each optical sensor chip individually, process variations induced during production or due to material properties can be accounted for, thus, further increasing accuracy of the calibrated sensor data. The same may be true for the calibration algorithm which can be tailor-made for the given optical sensor chip or optical sensor device, e.g. including the field of application at hand. Furthermore, the calibration algorithm can be updated or adjusted after production, e.g. by way of firmware updates at the customer's end.

In at least one embodiment, the optical sensor chip comprises one or more optical detector elements denoted "channels" hereinafter. There are different kinds of optical sensor chips which may only be configured to detect electromagnetic radiation such as optical radiation including infrared, visible or ultraviolet light. The sensor response data may characterize the sensitivity of each channel as functions of wavelength. In this sense the sensor response data comprises spectral information.

Measuring the sensor response data further involves recording at a reference temperature Tref a sensor sensitivity matrix. The sensor sensitivity matrix indicates a sensor sensitivity of a given channel as a function of wavelength, respectively. In case of a sensor with more than a single channel, the elements of the sensor sensitivity matrix indicate the sensor sensitivity of each channel as a function of wavelength, respectively.

Furthermore, a first set of temperature coefficients is recorded for at least one channel. The temperature coefficients indicate the sensor sensitivity for the at least one channel as a function of wavelength and operating temperature. The first set of temperature coefficients can be recorded for a single channel only. Then these coefficients can be applied to the remaining channels if those are expected to have a same or similar temperature dependency. However, the first set of temperature coefficients may instead be recorded for all or a subset of channels.

The characterization can be applied to different kinds of optical sensor chips. One or more channels are implemented in ambient light sensors, color sensors, gesture sensors, proximity sensors, time-of-flight sensors, etc. Typically, the optical sensor chips are complemented with further components including a sensor package, filters, optics stacks, etc. These components can inherently be accounted for by recording the sensor sensitivity matrix and its temperature dependency.

In at least one embodiment the optical chip further comprises one or more optical emitter elements, denoted "emitters" hereinafter. There are different kinds of optical sensor chips which may not only be configured to detect electromagnetic radiation but have on-chip emitters as well. These emitters comprise light emitting diodes or laser diodes such as VCSEL lasers, for example. The emitters may emit electromagnetic radiation such as optical radiation including infrared, visible or ultraviolet light. The sensor response data may characterize the sensitivity of each channel for the emission of the emitters. Furthermore, sensor response data may also include emission characteristics of the emitters.

Measuring the sensor response data further involves recording at the reference temperature Tref a spectral irradiance function which indicates an emission characteristic of a given emitter as a function of wavelength, respectively.

Furthermore, a second set of temperature coefficients is recorded for at least one emitter. This second set of temperature coefficients indicates the emission characteristic for the at least one emitter as a function of wavelength and operating temperature. The second set of temperature coefficients can be recorded for a single emitter only. Then these coefficients can be applied to the remaining emitters if there are more than a single emitter and are expected to have a same or similar temperature dependency. However, the second set of temperature coefficients may instead be recorded for all or a subset of emitters.

The characterization can be applied to different kinds of optical sensor chips. For example, one or more emitters are implemented in proximity sensors, time-of-flight sensors, spectral sensors etc. Typically, the optical sensor chips generate complex sensor data due to the increased amount of sensor components. Furthermore, sensor design becomes more complex as well and often comes with further components such as a sensor package, filters, optics stack, etc. These components can inherently be accounted for by recording the sensor sensitivity matrix and its temperature dependency.

In at least one embodiment measuring the sensor response data further involves recording a power distribution function of the one or more emitters. The power distribution function indicates a relative power distribution at a reference target which is located at a reference position. In addition, or alternatively, the power distribution function indicates a relative power distribution at a reference target as a function of several reference positions.

For a more complete calibration it may be beneficial to account for the actual output of the emitters. For example, diodes of a same type may still output a different intensity when used together with other such diodes on a same optical sensor chip. For example, a same forward current may lead to different output. These differences can be accounted for by recording the relative power distribution at the reference target. The reference target may be a target of known spectral reflectivity placed at a known distance with respect to the optical sensor chip. Measurement may be repeated at several reference positions in order to gain more complete data if necessary. Furthermore, power distribution function may also be recorded for different types of reference targets, such as white cards, black cards, grey cards or scales, etc.

In at least one embodiment a method of calibrating an optical sensor chip involves the optical sensor chip discussed above but integrated into an optical sensor device. The optical sensor device may be any host system into which the optical sensor chip can be integrated into and operated by. Examples of host systems include mobile devices such as smartphones, tablets, computers, displays, (medical) imagers, spectrometers, etc.

An unambiguous chip identification number is provided, chip ID, in order to identify the optical sensor chip. The optical sensor chip has been referenced with the chip ID during production, for example, and may be issued together with the optical sensor chip.

Sensor response data is retrieved using the chip ID. The sensor response data is saved together with the chip ID as a databank entry in a database, for example. The sensor response data is a function of wavelength and operating temperature. For example, the database or databank entry, including the chip ID and the sensor response data referenced with the chip ID, can be provided to the customer as a hard copy by means of a memory unit such as a memory stick. However, it is possible to provide the database or databank entry via a network such as the internet or a cloud service. For example, the sensor response data is saved on a server associated with the production site and can be accessed as a cloud solution from or by the customer with direct assignment via the chip ID.

A calibration algorithm is provided and associated with the chip ID. This can be done by the same technical means used for retrieving the sensor response data. The calibration algorithm can also be provided by means of a white paper which describes a way to compensate and calibrate the sensor data. Furthermore, providing the calibration algorithm can also be left completely to the customer who may use the calibration algorithm provided by the producing site and adjust the algorithm to fit their specific needs. Or the customer comes up with a calibration algorithm on its own which suits his needs and applications. In this sense the calibration algorithm is provided by the producer and/or by the customer.

Then, an operating temperature of the optical sensor device is measured. For example, the operating temperature may be measured using a temperature sensor of the optical device or an on-chip temperature sensor of the optical sensor chip.

Furthermore, a sensor output of the optical sensor chip is measured at the previously measured operating temperature. For example, the sensor output constitutes raw data or pre-processed data generated by means of the optical sensor chip. Pre-processing may involve digital conversion such as analog-to-digital conversion or time-to-digital conversion, for example.

Finally, the sensor output is calibrated using the retrieved sensor response data, the calibration algorithm and the operating temperature. The calibration algorithm comprises mathematical instructions on how to process the sensor output in order to derive calibrated sensor data. The calibration involves temperature compensation based on the measured operating temperature. This can be achieved as the sensor response data has been recorded as a function of temperature.

The optical sensor device defines an environment in which the optical sensor chip is operated. For example, the operating temperature not only is determined by the optical sensor chip but by the optical sensor device, e.g. by electrical components such as microprocessor embedded in the device. Thus, continuous temperature measurement and compensation allows for improved and more accurate sensor data. This way accuracy and robustness of the calibration largely depends on the quality of the sensor response data and the calibration algorithm.

The sensor response data can be recorded in a controlled laboratory environment at the site of production, for example. The production site may provide facilities to obtain the sensor response data in a controlled, standardized environment using standard light sources, monochromators, defined temperatures, cleanroom, etc. Furthermore, as the sensor response data can be recorded for each optical sensor chip individually, variations induced during production, integration into the optical sensor device or by material properties can be accounted for, thus, further increasing possible accuracy of the sensor data. The same may be true for the calibration algorithm which can be tailor-made for optical sensor chip and the field of application at hand. Furthermore, the calibration algorithm can be updated or adjusted after production, e.g. by way of firmware updates at the end of the customer. In other words, the customer is relieved of calibration tasks which relate to the optical sensor chip. Rather the customer, e.g. the producer of the optical sensor device, may concentrate on the specifics of the optical sensor device. A user of the optical sensor device may execute temperature compensation during operation of the device.

In at least one embodiment the method further comprises calculating for a measurement condition x and the operating temperature a system detection matrix from the retrieved sensor response data according to the calibration algorithm. A calibration matrix is determined from the system detection matrix. Then, the sensor output is calibrated using the calibration matrix.

The term "measurement condition x" accounts for the relevant parameters that define a step of calibration or the whole calibration process. For example, a measurement condition x is defined by wavelength (emission and/or detection), target properties (such as reflectivity and distance), channels or emitters involved in a measurement, etc. The system detection matrix is determined for set of parameters, i.e. for a specific measurement condition. As such the system detection matrix may be altered when the measurement condition x changes. One prominent aspect relates to temperature dependency of parameters such as sensor sensitivity which vary with temperature. The calibration matrix accounts for such variations and provides a mathematical framework to calibrate the raw sensor data recorded for a given measurement condition x to map into a calibrated sensor output.

In at least one embodiment a reference target of known optical properties is used to determine linear coefficients such that the calibrated sensor output is determined by a linear combination of the system detection matrix and the calibration matrix.

Calibration of the optical sensor chip integrated into the optical sensor device may suffice to create calibrated sensor data of high accuracy. However, in some cases calibration may be complemented with measuring a reference target using the optical sensor device rather than the optical sensor chip alone. The reference target may be implemented as a white, black or grey card of known reflectivity at a given wavelength, for example. This way the customer can determine the linear coefficients using the optical sensor device. This can be done with a linear combination of the system detection matrix and the calibration matrix determined by the optical sensor chip and then fitting the linear coefficient to solve the linear combination. This way calibration may be further improved as this proposed measurement is done with the optical sensor chip embedded in the optical sensor device, i.e. its intended optical environment rather than at the production line as a single device.

In at least one embodiment the operating temperature is repeatedly measured. The sensor output is calibrated for each measured operating temperature. For example, during operation of the optical sensor device, the operating temperature may undergo changes in temperature. Typically, the device may heat up when a measurement is started and returns to a lower temperature when the optical sensor chip is not activated. Furthermore, other components in the device may also contribute to an overall operating temperature and may not be present at all times. Thus, measuring and compensating for the actual operating temperature may further improve accuracy of the calibrated sensor data.

In at least one embodiment the optical sensor chip comprises one or more optical detector elements, denoted "channels" hereinafter. Calibrating the sensor output involves compensating a sensor sensitivity matrix for the operating temperature using a coefficient from a first set of temperature coefficients. The temperature coefficients of the first set indicate a sensor sensitivity for the at least one channel as a function of wavelength and operating temperature. The sensor response data comprises the sensor sensitivity matrix which indicates a sensor sensitivity of a given channel as a function of wavelength at a reference temperature Tref, respectively.

There are different kinds of optical sensor chips which may only be configured to detect electromagnetic radiation such as optical radiation including infrared, visible or ultraviolet light. The sensor response data may characterize the sensitivity of each channel as functions of wavelength. In case of a sensor with more than a single channel, the elements of the sensor sensitivity matrix indicate the sensor sensitivity of each channel as a function of wavelength, respectively. The first set of temperature coefficients may have been recorded for a single channel only. Then these coefficients can be applied to the remaining channels if those are expected to have a same or similar temperature dependency. However, the first set of temperature coefficients may instead be recorded for all or a subset of channels.

The calibration can be applied to different kinds of optical sensor chips and may inherently account for their different design properties. One or more channels are implemented in ambient light sensors, color sensors, gesture sensors, proximity sensors, time-of-flight sensors, etc. Typically, the optical sensor chips are complemented with further components such as a sensor package, filters, optics stack, etc. These components can inherently be accounted for by the sensor sensitivity matrix and compensating its temperature dependency for the actual operating temperature of the optical sensor device.

In at least one embodiment the optical sensor chip comprises one or more optical emitter elements, denoted "emitters" hereinafter. Calibrating the sensor output involves compensating a spectral irradiance function for the operating temperature using a coefficient from a second set of temperature coefficients. The temperature coefficients indicate for at least one emitter an emission characteristic as a function of wavelength and operating temperature, respectively. The sensor response data further comprises the spectral irradiance function indicating the emission characteristic of a given emitter as a function of wavelength at a reference temperature Tref, respectively.

Optical sensor device may be equipped with optical sensor chips which may have on-chip emitters, for example. These emitters comprise light emitting diodes or laser diodes such as VCSEL lasers, for example, and may emit electromagnetic radiation such as optical radiation including infrared, visible or ultraviolet light. The second set of temperature coefficients may at least characterize temperature dependency of emission for at least one emitter as a function of wavelength. The coefficients can be applied to the remaining emitters if there are more than a single emitter and are expected to have a same or similar temperature dependency. However, the second set of temperature coefficients may instead have been recorded for all or a subset of emitters.

The calibration can be applied to different kinds of optical sensor chips and may inherently account for their different design properties. For example, one or more emitters are implemented in proximity sensors, time-of-flight sensors, spectral sensors etc. Typically, the optical sensor chips provide complex sensor data due to the increased amount of sensor components. Furthermore, sensor design becomes more complex as well and often comes with further components such as a sensor package, filters, optics stack, etc. These components can inherently be accounted for by the sensor sensitivity matrix and compensating its temperature dependency for the actual operating temperature of the optical sensor device.

In at least one embodiment calibrating the sensor output further involves weighting the temperature compensated spectral irradiance function with a power distribution function of the one or more emitters. The power distribution function indicates a relative power distribution at a reference target which is located at a reference position or a relative power distribution at a reference target as a function of several reference positions.

For a more complete calibration it may be beneficial to account for the actual output of the emitters. For example, diodes of a same type may output a different intensity when used together with other such diodes on a same optical sensor chip. For example, a same forward current may lead to different output. These differences can be accounted for by recording the relative power distribution at the reference target. The reference target may be a target of known reflectivity placed at a known distance with respect to the optical sensor chip. Measurement may be repeated at several reference positions in order to gain more complete data if necessary. Furthermore, power distribution function may also be recorded for different types of reference targets, such as white cards, black cards, grey cards or scales, etc.

In at least one embodiment a method of operating an optical sensor device comprises characterizing an optical sensor chip according to the aspects discussed above. Furthermore, the method involves calibrating the optical sensor chip according to one or more aspects discussed above. Finally, a calibrated sensor output is measured.

Using the proposed method may essentially split the task of recording sensor response data and actual calibration to different places. For example, sensor response data can be recorded on a per device basis and in controlled conditions and with high accuracy at the production site. Furthermore, a calibration algorithm can be tailor-made for the optical sensor chip and/or optical sensor device. Calibration may be performed by the customer when the optical sensor chip is integrated in the optical sensor device. Furthermore, continuous or repeated temperature compensation may account for effects of temperature on the accuracy of calibrated sensor data output by the optical sensor device.

In at least one embodiment an optical sensor device comprises a host system and a temperature sensor to measure an operating temperature of the optical sensor device. Examples of host systems include mobile devices such as smartphones, tablets, computers, displays, (medical) imagers, spectrometers, etc.

Furthermore, the optical sensor device comprises an optical sensor chip which is referenced with an unambiguous chip identification number, chip ID. A memory is provided to save sensor response data and the calibration algorithm which is associated with the chip ID. A processing unit is provided to access the memory using the chip ID and to process a calibration of a sensor output of the optical sensor chip using the calibration algorithm, the sensor response data and the operating temperature.

During operation the optical sensor device may enter a calibration mode of operation, e.g. during manufacture of the device or during use by the end customer. During the calibration mode the memory can be accessed, e.g. by means of the processing unit. This way the sensor response data which has been recorded for the optical sensor chip integrated in the optical sensor device can be retrieved using the unambiguous chip ID. For example, the chip ID can be used as an identifier to assure that the correct sensor response data is retrieved. Furthermore, the calibration algorithm is also retrieved. For example, the calibration algorithm may be embodied as software and firmware including a set of instructions on how to perform the calibration of sensor data. In turn, the processing unit executes or processes the calibration of a sensor output of the optical sensor chip using the calibration algorithm. Raw sensor or pre-processed sensor data is input into the calibration algorithm together with the sensor response data and operating temperature. For example, pre-processing of sensor data may involve analog-to-digital conversion or time-to-digital conversion. The calibration mode of operation may be a dedicated mode which the customer needs to initiate. However, the calibration mode of operation may run in the background without any user interaction, e.g. by continuously applying a temperature compensation of sensor output.

The optical sensor device allows for generating calibrated sensor data of improved accuracy. This is supported by the use of the optical sensor chip which is associated with dedicated sensor response data and a calibration algorithm using the chip ID. The sensor response data can be recorded during manufacture of the optical sensor chip in a controlled environment of the production line including a controlled or standardized environment, such as standard light sources, monochromators, defined temperatures, cleanroom, etc. In such an environment the sensor response data can be recorded at high resolution and with high accuracy. Furthermore, as the sensor response data can be recorded for each optical sensor chip individually, process variations induced during production or due to material properties can be accounted for, thus, further increasing accuracy of the calibrated sensor data. The same may be true for the calibration algorithm which can be tailor-made for the given optical sensor chip or optical sensor device, e.g. including the field of application at hand. Furthermore, the calibration algorithm can be updated or adjusted after production, e.g. by way of firmware updates at the customer's end.

In at least one embodiment the memory comprises an interface to input the sensor response data and the calibration algorithm. In addition, or alternatively, a communication unit is arranged to access the database remotely to retrieve, using the chip ID, the sensor response data and the calibration algorithm associated with the chip ID.

The sensor response data has been recorded during manufacture of the optical sensor chip. The data and the algorithm enter the optical sensor device via the interface or by way of a remote connection such as Wi-Fi, access points or mobile networks. In general, the sensor response data is not saved on the chip but provided to the customer, e.g. during manufacture of the device or during use by the end customer, in a remote way. For example, a database can be accessed using the chip ID in order to retrieve the sensor response data referenced with the chip ID. The data can be provided to the customer as a hard copy, e.g. as a memory unit such as a memory stick. However, it is possible to provide the database via a network by means of ftp, the internet or a cloud service. For example, the sensor response data is saved on a server associated with the production site and can be accessed as a cloud solution from or by the customer with direct assignment via the chip ID.

In at least one embodiment a calibration system comprises a chip calibration setup which is located at a production line of the optical sensor chip. The chip calibration setup is arranged to perform characterization of the optical sensor chip according to one or more aspects discussed above. Furthermore, a device calibration setup is located at the production line of the optical sensor device comprising the optical sensor chip. The device calibration setup is arranged to perform a calibration of the optical sensor device according to one or more aspects discussed above.

Further implementations of the methods are readily derived from the various implementations and embodiments of the devices and vice versa.

In the following, the concept presented above is described in further detail with respect to drawings, in which exemplary embodiments are presented.

In the examples of embodiments and Figures below, similar or identical elements may each be provided with the same reference numerals. The elements illustrated in the drawings and their size relationships among one another, however, should not be regarded as true to scale. Rather individual elements, such as layers, components, and regions, may be exaggerated to enable better illustration or improved understanding.

BRIEF DESCRIPTION OF THE DRAWINGS

FIG. 4 shows an example process flow of a method of calibrating an optical sensor chip, FIGS. 5A, 5B show an example process flow of channel temperature compensation, FIGS. 6A, 6B show an example process flow of emitter temperature compensation, FIGS. 7A, 7B show an example process flow of weighting using a power distribution, FIGS. 9A, 9B, 9C show example process flows of calculating a calibration matrix, FIG. 10 shows additional means to further improve the calibration process flow.

DETAILED DESCRIPTION

Figure 1:
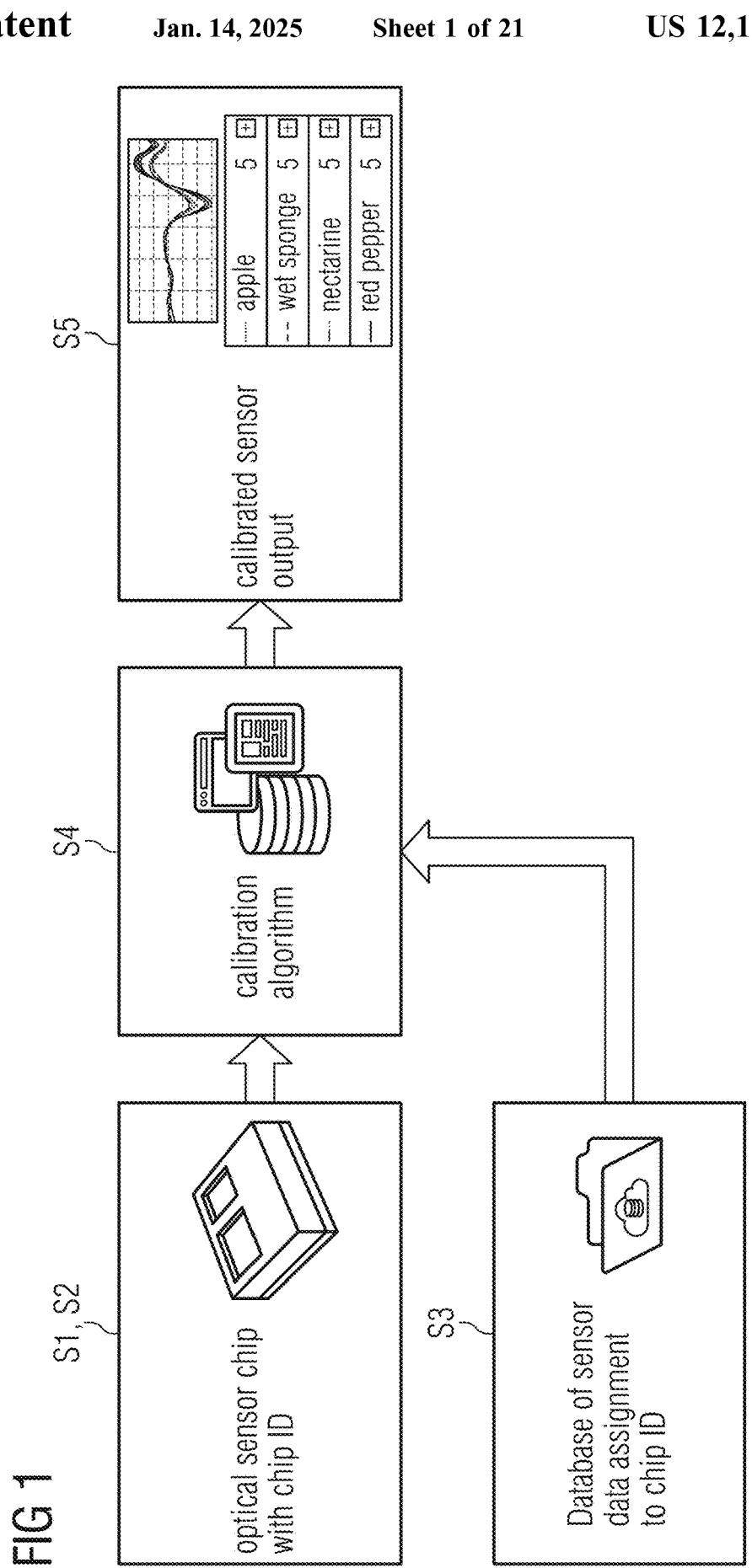
FIG. 1 shows an example flowchart of a method of characterizing an optical sensor chip.

FIG. 1 shows an example flowchart of a method of characterizing an optical sensor chip. The proposed process flow can be executed during or after manufacturing of the optical sensor chip, e.g. at a production line. The optical sensor chip is referenced with an unambiguous chip identification number, chip ID (step s1). The chip ID can be associated with the given optical sensor chip in various ways. For example, electronic components of the optical sensor chip typically provide a memory and means to access the memory. Thus, the memory can be configured to save the chip ID, which can then be accessed by the customer via a sensor interface, for example. Furthermore, the optical sensor chip typically comprises a sensor package and the chip ID can be branded on the package. However, it is also possible to provide the chip ID with the optical sensor chip when the chip is shipped, e.g. as documentation, white paper, a data sheet and the like.

Furthermore, the optical sensor chip is characterized using sensor response data which are a function of wavelength and operating temperature (step s2). The sensor response data is measured for each individual optical sensor chip, e.g. when the optical sensor chip has been finally assembled at the production line. Measuring the sensor response data can be performed in a controlled laboratory environment associated with the production line.

The term "wavelength" may refer to emission and detection wavelength(s) depending on whether the optical sensor chip is configured for emitting and/or detecting electromagnetic radiation. The term "operating temperature" may refer to a temperature which is characteristic for the operating conditions of the optical sensor chip, e.g. ambient temperature, device temperature, chip temperature, emitter temperature, etc.

The sensor response data is saved together with the chip ID as a databank entry in a database (step s3). The sensor response data is assigned to the unambiguous chip ID and, in turn, can be retrieved from the database using the chip ID. The database of sensor data is made available to a customer. This can be achieved in several different ways. For example, the relevant sensor response data associated with a given chip ID can be provided together with the optical sensor chip as a datasheet including the relevant data as a hard copy or be saved on a memory device, such as a memory stick which is provided together with the optical sensor chip. Furthermore, the database can be made available to the customer via a network, such as a FTP server or cloud service. Then, the database can be searched using the chip ID and the individual data collected for a given optical sensor chip assigned to the chip ID can be retrieved.

Furthermore, a calibration algorithm is provided and is associated with the chip ID (step s4). The calibration algorithm can be used together with the sensor response data to calibrate a sensor output of the optical sensor chip. In general, the calibration algorithm can be provided from the manufacturer or by the customer. In case the calibration algorithm is provided by the manufacturer, it can be made available by the same means as the sensor response data. For example, the calibration algorithm can be provided as software or firmware which could be uploaded to an optical device into which the optical sensor chip is embedded.

Finally, the calibration algorithm and the sensor response data can be used together in an optical device comprising the optical sensor chip. Using the sensor response data and the calibration algorithm a sensor output can be calibrated to generate a calibrated sensor output (step s5). This process will be discussed in further detail below.

The proposed method of characterizing an optical sensor chip addresses several issues. In contrast to alternative processes it is envisaged not to deliver a calibrated sensor by the manufacturer. This may have several advantages. For example, a complete manufacturer-side calibration may not address the complexity of sensor data and may also neglect compensation efforts such as temperature compensation. Furthermore, it is possible to optimize the compensation methods and algorithm during manufacturing but also at a later point in time, for example by means of a software or firmware update. Furthermore, additional parameters and methods which may be specific for an intended application in an optical device can be added for further optimization.

It is also possible to not rely on a single calibration algorithm which is defined by the manufacturer only. Using the proposed process flow it is possible to use several algorithms and choose the one which is best suited for the intended application. Thus, the optical sensor chip can be considered a tested sensor which is provided with a set of sensor response data characterizing the sensor at various wavelengths and operating temperatures. The sensor response data is characteristic for the individual optical sensor chip can be measured with high accuracy in a controlled environment of a laboratory at the production line. The data is saved in a database, such as a server or cloud with direct assignment via the chip ID. The calibration algorithm which can be provided as software, firmware or a white paper, for example, provides a complete method to compensate and calibrate the sensor output data.

Figure 2:
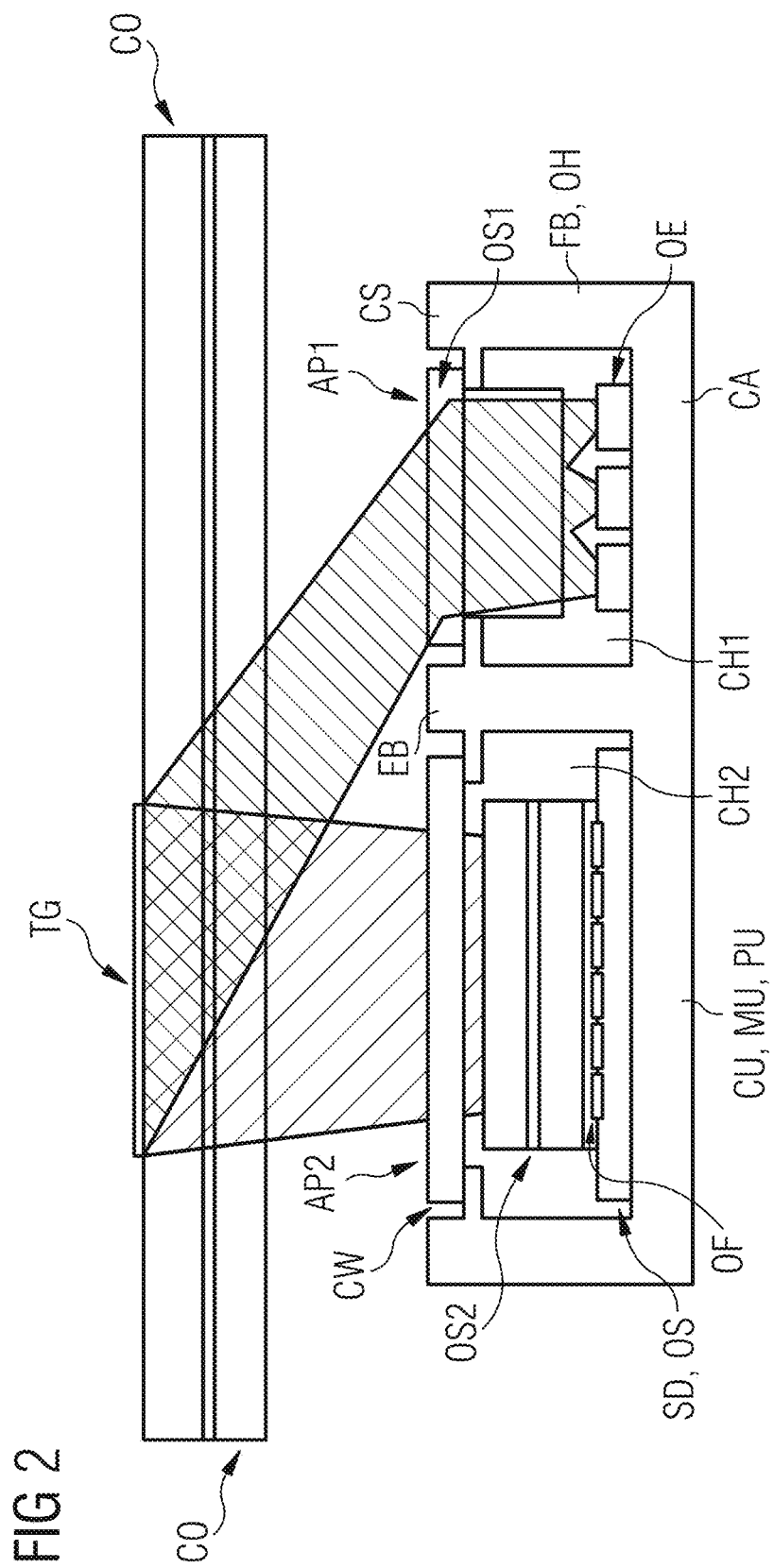
FIG. 2 shows an example of an optical sensor chip.

FIG. 2 shows an example of an optical sensor chip. The processes proposed herein can be applied for various types of optical sensor chips and optical devices. In general, there are optical sensors which only have optical detector elements (denoted channels hereinafter) or optical sensors which also have one or more optical emitter elements (denoted emitters hereinafter). The following example is an optical sensor chip comprising both channels and emitters in a common sensor package.

In this example embodiment the optical sensor chip is configured as a multispectral sensor. The multispectral sensor comprises an opaque housing OH with two chambers: a first chamber CH1 and a second chamber CH2. The opaque housing OH is arranged on a carrier CA and comprises a light barrier LB which divides the housing into the first and a second chamber CH1, CH2. The first and second chambers CH1, CH2 are further confined laterally by a frame body FB arranged in the housing. A cover section CS is located opposite to the carrier CA and thereby covers the chambers CH1, CH2. The cover section CS, the frame body FB, and the light barrier LB are manufactured by a continuous piece of material, such as a mold material, for example. The carrier CA provides mechanical support and electrical connectivity to electronic components which are integrated into the multispectral sensor. For example, the carrier CA comprises a printed circuit board, PCB (not shown). However, in other embodiments (not shown) the carrier CA can also be part of the housing and electronic components are embedded into the housing by molding, for example.

An array of optical emitters OE is located inside the first chamber CH1. The optical emitters OE are arranged on the carrier CA and are electrically connected to the carrier CA, e.g. to the PCB. The optical emitters OE can be implemented as light emitting diodes, such as NIR-LEDs emitting (near) infrared radiation, NIR, or be implemented as laser diodes, such as VCSELs or VECSELs, for example. These types of optical emitters are configured to emit light at a specified wavelength or in a specified range of wavelengths, respectively, e.g. in the UV, visual or infrared part of the electromagnetic spectrum. The emission may be narrow- or broadband. For example, vertical-cavity surface-emitting lasers, VCSEL, or vertical-external-cavity surface-emitting-lasers, VECSEL, predominantly emit in the IR or NIR, e.g. at 940 nm.

An optical sensor OS is arranged inside the second chamber CH2 and on the carrier CA. In this embodiment, the optical sensor is integrated into a single semiconductor die SD together with other electronics. The optical sensor OS comprises an array of optical detector elements, e.g. pixels. The channels may be implemented as photodiodes, for example.

An array of optical filters OF is arranged in the second chamber CH2 above the optical sensor OS. The array of optical filters OF is attached to the optical sensor OS. The pixels each are associated with an optical filter having a different transmission characteristic. Together the pixels and associated filter form a "channel" of the optical sensor chip. The optical filters in the array of optical filters OF have a transmission characteristic which blocks or at least attenuates at the specified wavelength of the optical emitter OE. The optical filters OF may be interference filters such as optical cut-off filters, bandpass, long or short pass filters, dielectric filters, Fabry-Perot filters and/or polymer filters. Typically, the passband is chosen with respect to a fluorescence probe to be studied and the optical filters OF pass light having a wavelength corresponding to the fluorescence emission of the probe.

First and second apertures AP1, AP2 are arranged in the cover section CS. The first and the second apertures AP1, AP2 are positioned above the optical emitters OE and the optical sensor OS, respectively. In fact, the apertures AP1, AP2 lie within a field of view of the optical emitters OE and the optical sensor OS, respectively.

Optionally, optical systems can be arranged inside the first and second chambers CH1, CH2, respectively. For example, a first optical stack OS1 comprises a lens or system of lenses and is attached to the optical emitters OE inside the first chamber CH1. The first optical stack OS1 can be configured to guide and focus emitted light from the optical emitters OE towards a target TG which can be positioned in the field of view, FOV, of the optical stack in a characteristic distance, for example. Typically, the multispectral sensor is placed at a distance of 5 to 10 mm with respect to the external target TG, e.g. a fluorescent probe. In addition, the optical stack OS1 may have optical filters or protective glass layers or windows, for example. The first and second chambers CH1, CH2 may be sealed with an optical window OW, respectively.

Furthermore, a second optical stack OS2 comprises a lens or system of lenses and is attached to the optical sensor OS inside the second chamber CH2. For example, the second optical stack OS2 comprises an array of micro-lenses AM wherein individual micro-lenses are associated with pixels of the optical sensor, respectively. The micro-lenses can be adjusted in their optical properties (focal length, lens diameter, distance between lens and pixel, etc.) such that each associated pixel of the optical sensor OS is detecting light only from a defined region of the target TG. In addition, the second optical stack OS2 may have further optical layers, e.g. optical filters, angular filters or protective glass layers or windows, for example. Furthermore, the second optical stack may also have an additional lens to narrow the FOV of the optical sensor, e.g. to 10 degrees or smaller. The optical filters in the array of filters OF can be aligned with respect to the micro-lenses of the array of micro-lenses AM. This way each pixel of the optical sensor OS can be associated with an individual filter and/or micro-lens.

Typically, further electronic components such as a control unit CU and a measurement unit MU are integrated into the same semiconductor die SD alongside with the optical sensor OS. However, these components will not be described in detail here. It will be assumed that the optical sensor chip and the optical device comprise the necessary electronic components to operate the sensor. For example, the discussed optical sensor chip emits light towards a target TG in its FOV and detects light after reflection at the external target TG by means of the optical sensor OS, e.g. for a fixed detector position and orientation.

The various components of the optical sensor chip discussed above have a possible impact on the performance of such an optical sensor chip. The following provides an overview of parameters that may affect the operation of the optical sensor chip and accuracy of sensor data. The optical emitters OE are characterized by a spectral irradiance function, a power distribution of emission, position accuracy of emitters and a temperature dependence of said parameters. The function of the first optical stack OS1 is influenced by a position accuracy and influences the FOV to target TG of the emitters and defines an effective aperture diameter, for example.

Typically, in an optical device, a cover CO, such as a glass layer, is provided above the optical sensor chip, e.g. as part of the optical device. The emission originating from the optical emitters OE traverses through the cover CO and, thus, its properties are relevant for the optical sensor performance. Parameters to consider involve thickness and position, refraction index and transmission characteristics of the cover CO, for example.

The emission is directed onto an area of an external target TG, and thus, parameters characteristic of a target area illuminated by the emission may be considered as parameters for system description as well. Such parameters include reflectivity, scattering and opacity of the target area, the FOV available to the optical emitters OE and a power distribution in spectral composition of the emitted light reaching the target area. Finally, in some applications also a target shape may be considered.

Optical sensor chips, such as the multispectral sensor described above, may evaluate the reflection at the target TG which is detected by one or more channels arranged in the second chamber CH2 of the optical sensor chip. Thus, also parameters describing the reflection may be evaluated in order to describe a system characterization. Thus, a thickness and gap, reflection index and transmission of the cover CO may be considered. The second chamber CH2 is covered with a clear optical window OW which has a spectral transmission and reflection characteristic. Furthermore, the second optical stack OS2 arranged above the optical sensor OS affects the FOV to target, aperture and position accuracy. Furthermore, the optical filters OF are characterized by spectral transmission characteristics, respectively. Finally, the channels have a spectral sensitivity of their own, may be prone to crosstalk and typically show temperature dependence. A temperature profile of both emitters OE and channels may be affected by ambient temperature, device temperature, emitter temperature and thermal gradients in the optical device.

The proposed concept allows for calibration and characterization of the optical sensor chip in its final assembled state. Thus, by recording the sensor response data the multitude of system parameters summarized above can inherently be accounted for. As will be discussed below, a calibration algorithm can be provided which reduces complexity to a measurement of a spectral sensitivity for each detector pixel, channel, spectra of each emitter, e.g. LED, and power distribution in the target area. Furthermore, the provided sensor response data is also measured as a function of temperature which allows for temperature compensation during application of the optical sensor chip in an optical device.

Figure 3:
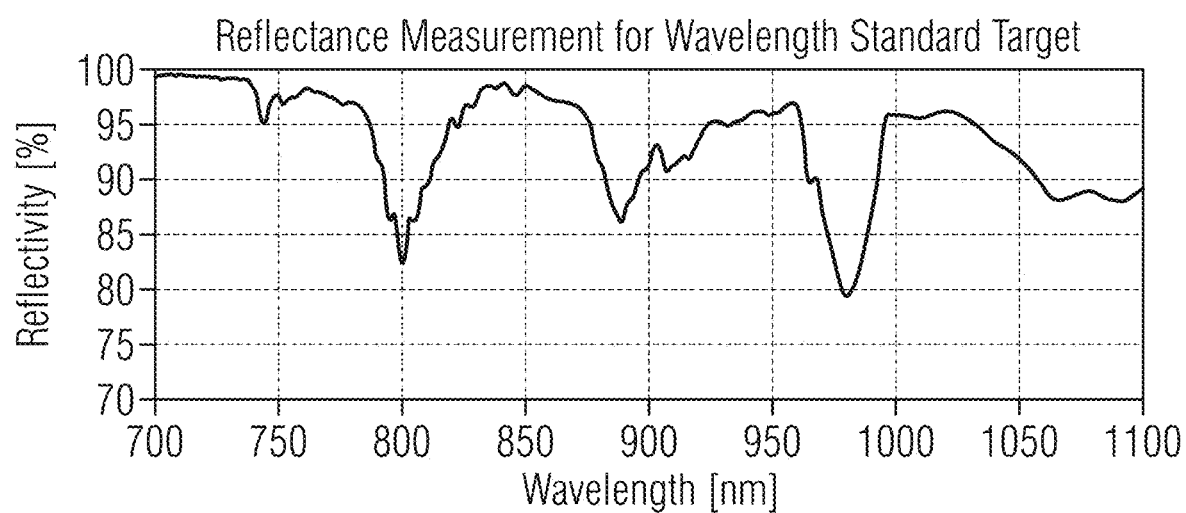
FIG. 3 shows an example measurement of calibrated sensor output.

FIG. 3 shows an example measurement of calibrated sensor output. This example indicates an example reflectance measurement for a wavelength standard target using the optical sensor chip of FIG. 2. Reflectance of a surface is a material property and indicates an effectiveness in reflecting radiant energy. The reflectance spectrum or spectral reflectance curve shown in the drawing is a function of wavelength. Thus, the calibrated sensor output data constitutes a measure of reflectance, i.e. a fraction of incident electromagnetic power that is reflected at the target surface as a function of wavelength, e.g. spanning from 700 to 1100 nm. Calibration is necessary in order to obtain sensor data which complies with custom or international standards such as SI radiometry units, for example.

As discussed above the sensor output data from the optical sensor chip depends on various parameters which are influenced by the components of the optical sensor chip and the optical sensor device into which the chip is integrated. The sensor output can be calibrated using a calibration procedure. The following discussion assumes an optical sensor chip, an optical sensor device, an external target t placed in the field of view, FOV, of the optical sensor chip and a measurement condition x including an operation temperature. One possible procedure will be discussed in further detail below. Consider the optical sensor chip is configured as the multispectral sensor discussed with respect to FIG. 2.

A calibrated output matrix for a given target t will be denoted $R_t$ hereinafter. For example, the calibrated output matrix represents calculated, or calibrated, reflectance values at the target t, and is a function of wavelength $\lambda$. $R_t(\lambda_k)$ denotes an element of the calibrated output matrix $R_t$, e.g. a calculated reflectance of target t at an emission wavelength $\lambda_k$. The parameter k denotes wavelength points of reconstruction, such as $\lambda_k=\lambda_1, \ldots, \lambda_K=750$ nm, ..., 1050 nm, wherein K denotes a total number of reference wavelengths, i.e. $k=1, \ldots, K$. The term $R_0(\lambda_k)$ denotes an element of a standard calibrated output matrix $R_0$, e.g. a calculated reflectance of a standard target, denoted $t=0$, at an emission wavelength $\lambda_k$. The standard target $t=0$ may be implemented as a calibration card, e.g. a white card, which is known to have a standard reflectance, e.g. 99% reflectance, at $\lambda_k$. For 301 wavelength points of reconstruction the calibrated output matrix $R_t$ is represented by a 301×1 matrix, for example.

Various sensor response data defines a calibration matrix $M_x$. The index x indicates the measurement condition for which the calibration matrix $M_x$ is valid, e.g. operating temperature, forward current of LEDs, etc. For example, for one measurement condition x there are 301 wavelength points and 61 channels, and $M_x$ is represented by a 61×301 matrix. In this case the calibration matrix $M_x$ has the generic form:

$$M_x = \begin{bmatrix} k_{1,1} & \cdots & k_{1,301} \\ \vdots & \ddots & \vdots \\ k_{61,1} & \cdots & k_{61,301} \end{bmatrix}.$$

The uncalibrated output matrix of the optical sensor chip will be denoted $\text{Dig}_{t,x}$. For example, this matrix represents the channel digits of a reflectance at target t at measurement condition x. $\text{Dig}_{t,x,c}$ represents an element of the uncalibrated output matrix, e.g. a digit of channel c of a reflectance at target t and measurement condition x. The index c indicates a detection channel of the optical sensor chip OS. For example, the optical sensor chip has 61 channels $c=(1, \ldots, 61)$. Then the uncalibrated output matrix $\text{Dig}_{t,x}$ is represented by a 61×1 matrix:

$$\text{Dig}_{t,x} = \begin{bmatrix} \text{Dig}_{t,x,1} \\ \vdots \\ \text{Dig}_{t,x,61} \end{bmatrix}.$$

Using this terminology the calibrated output matrix $R_t$ can be expressed as:

$$R_t = M_x^+ \cdot \text{Dig}_{t,x}.$$

This general expression can be solved in order to calibrate the output of the optical sensor chip integrated in the optical device, to provide calibrated sensor data. This will be further elaborated on in the following discussion. Please note that the discussion presented hereinafter assumes the optical sensor chip introduced in FIG. 2. However, the equations discussed so far are general in the sense that they hold true for other types of optical sensor chips as well. The equations that will be derived below can be modified to apply to other types of optical sensor chips and merely serve as an example and should not be considered restricting the scope of the proposed concept.

The uncalibrated output matrix $\text{Dig}_{t,x}$ depends on a reflectance of the target t and depends on sensor sensitivity. A measured reflectance matrix $I_t$ represents the measured reflectance of target t as a function of emission wavelength $\lambda_j$. $I_t(\lambda_j)$ denotes an element of the measured reflectance matrix $I_t$, e.g. a measured reflectance of target t at an emission wavelength $\lambda_j$. The parameter j is used as index of a base of spectral data, such as $\lambda_j=\lambda_1, \ldots, \lambda_J=700$ nm, ..., 1100 nm. Index J denotes a total number of wavelength points in the spectral base, i.e. $j=1, \ldots, J$. The term $I_0(\lambda_j)$ denotes an element of a measured standard reflectance matrix $I_0$, e.g. a measured reflectance of a standard target $t=0$ at an emission wavelength $\lambda_j$. The standard target may be implemented as a calibration card, e.g. a white card, which is known to have a standard reflectance, e.g. 99% reflectance, at $\lambda_j$. For example, a spectral base of 401 wavelength points results in a measured reflectance matrix $I_t$ which is represented by a 401×1 matrix.

Furthermore, sensor sensitivity also is a function of wavelength. A sensor sensitivity matrix $S_{DUT_x}$ represents the sensor sensitivity of all channels at measurement condition x measured by way of reflection at target t. The sensor sensitivity is defined for the situation that the detector channels are irradiated by means of the emitters OE, e.g. LEDs. Thus, an element of the sensor sensitivity matrix, denoted $S\_DUT_{x,c}(\lambda_j)$, is a function of wavelength $\lambda_j$, e.g. included in the base of spectral data detected by channel c. In other words $S\_DUT_{x,c}(\lambda_j)$ represents the sensitivity of channel c and measurement condition x measured by way of reflection at target t. As sensor sensitivity depends on the detection wavelength rather than the nature of the target, the sensor sensitivity matrix is not indexed with t.

The uncalibrated output matrix $\text{Dig}_{t,x}$ can be expressed using the measured reflectance matrix $I_t$ and sensor sensitivity matrix $S_{DUT_x}$ to yield:

$$\text{Dig}_{t,x} = I_t \cdot S_{DUT_x}.$$

Using this expression the calibrated output matrix reads $$R_t = M_x^+ \cdot \text{Dig}_{t,x} = M_x^+ \cdot I_t \cdot S_{DUT_x}.$$

Calibration aims at an accurate reconstruction, i.e. a target reflectance should approximately be the same as a calibrated target reflectance, or $R_t \approx I_t$. This can be achieved when the calibration matrix $M_x$ is given by $$M_x^+ = (S_{DUT_x})^{-1}.$$

Thus, accuracy and robustness of transformation of measured raw sensor data into calibrated sensor data depends on the quality of the calibration matrix $M_x$. The calibration matrix $M_x$ can be calculated by inverting the sensor sensitivity matrix $S_{DUT_x}$, e.g. as a Pseudoinverse or Wiener inverse or similar operations.

Calibration may be complemented with a white target referencing. The white target may be a standard white, or gray card, or a chart of known reflectance at standardized wavelengths. White target referencing can be expressed as a linear combination of calibration matrix $M_x$ and uncalibrated output matrix $\text{Dig}_{t,x}$:

$$R_t = a \cdot M_x^+ \cdot \text{Dig}_{t,x} + b,$$

wherein a and b denote linear coefficients.

An element $S\_DUT_{x,c}(\lambda_j)$ of the sensor sensitivity matrix $S_{DUT_x}$ indicates the sensor sensitivity of a given channel c and measurement condition x. The elements can be expressed using experimentally determined sensor response data, e.g. as a product of irradiance $E_{x,c}(\lambda_j)$ and sensor channel sensitivity $S_{Detector_{x,c}}(\lambda_j)$:

$$S\_DUT_{x,c}(\lambda_j) = E_{x,c}(\lambda_j) \cdot S_{Detector_{x,c}}(\lambda_j).$$

The term $E_{x,c}(\lambda_j)$ denotes an irradiance of the optical emitters OE, such as LEDs. In an example embodiment using five LEDs as emitters OE the irradiance can be expressed as:

$$E_{x,c}(\lambda_j) = \sum_{LED=1}^{5}(E_{LED,x}(\lambda_j) \cdot f(c)),$$

wherein $E_{LED,x}(\lambda_j)$ denotes an irradiance of a given emitter OE, e.g. LED=1, . . . , 5, at wavelength $\lambda_j$ and at measurement condition x. The term f(c) denotes a power distribution factor of channel c to weight a contribution of the given emitter to a detection at wavelength $\lambda_j$. In general, the irradiance of the optical emitters OE is a function of various parameters, including emitter emission spectra, temperature, forward current, binning, distance to target, power distribution on target, for example.

The sensor channel sensitivity $S_{Detector_{x,c}}(\lambda_j)$ denotes a sensor sensitivity of a given channel c and measurement condition x, however, independent from the actual irradiance from the emitters. The sensor channel sensitivity $S_{Detector_{x,c}}(\lambda_j)$ is a function of wavelength $\lambda_j$. It has, however, contributions which relate to the properties of the sensor components of the optical sensor chip $S_{CMOS_x}(\lambda_j)$, e.g. CMOS photodiodes, and contributions related to the other components of the optical sensor chip $T_{OPTIC_c}(\lambda_j)$, e.g. filters, variations due to processing, packaging, etc. $S_{CMOS_x}(\lambda_j)$ denotes a CMOS photodiode sensitivity at measurement condition x and is a function of basic spectra and temperature, for example. $T_{OPTIC_c}(\lambda_j)$ denotes a transmission function and may be considered constant for a given optical design, such as transmission of filters and further components, variations due to processing, packaging, etc. The sensor channel sensitivity $S_{Detector_{x,c}}(\lambda_j)$ can be expressed as:

$$S_{Detector_{x,c}}(\lambda_j) = S_{CMOS_x}(\lambda_j) \cdot T_{OPTIC_c}(\lambda_j).$$

FIG. 4 shows an example process flow of a method of calibrating an optical sensor chip. The optical sensor chip is integrated into an optical sensor device. The optical sensor chip is provided with an unambiguous chip identification number, chip ID, to identify the optical sensor chip. In this example, the optical sensor chip of FIG. 2 has been characterized at the production line and is referenced with its chip ID.

The calibration process is depicted with reference to four basic stages ST1 to ST4. The first stage ST1 involves retrieving the sensor response data using the chip ID. In this example, the sensor response data has been recorded for a standard measurement condition, abbreviated as x=0. The sensor response data comprises the sensor sensitivity of the respective channels c as a function of wavelength $\lambda_j$, denoted $S_{Detector_{0,c}}(\lambda_j)$, spectral radiance functions $E_{LED,0}(\lambda_j)$ indicating the emission characteristics of the optical emitters OE as a function of wavelength $\lambda_j$, first and second temperature coefficients and a power distribution on target.

The second stage ST2 involves measuring an operating temperature of the optical sensor device, denoted x ° C. In this stage the sensor sensitivity and spectral radiance functions are temperature compensated using the first and the second temperature coefficients, respectively. The compensation is applied according to the calibration algorithm associated with the chip ID.

In the third stage ST3 the temperature compensated spectral radiance functions are weighted using the power distribution on target which represents a measured or simulated relative power distribution at the target TG.

Finally, in stage ST4 the temperature compensated sensor sensitivity and weighted temperature compensated spectral radiance functions are combined into a system detection spectra SDS for the previously measured operating temperature and are calculated using the calibration algorithm. In the mathematical framework derived above the system detection spectra SDS are represented by the sensor sensitivity matrix $S_{DUT_x}$. The system detection matrix determines the calibration matrix which can be used to calibrate sensor output data into calibrated sensor output data.

Figure 5A:
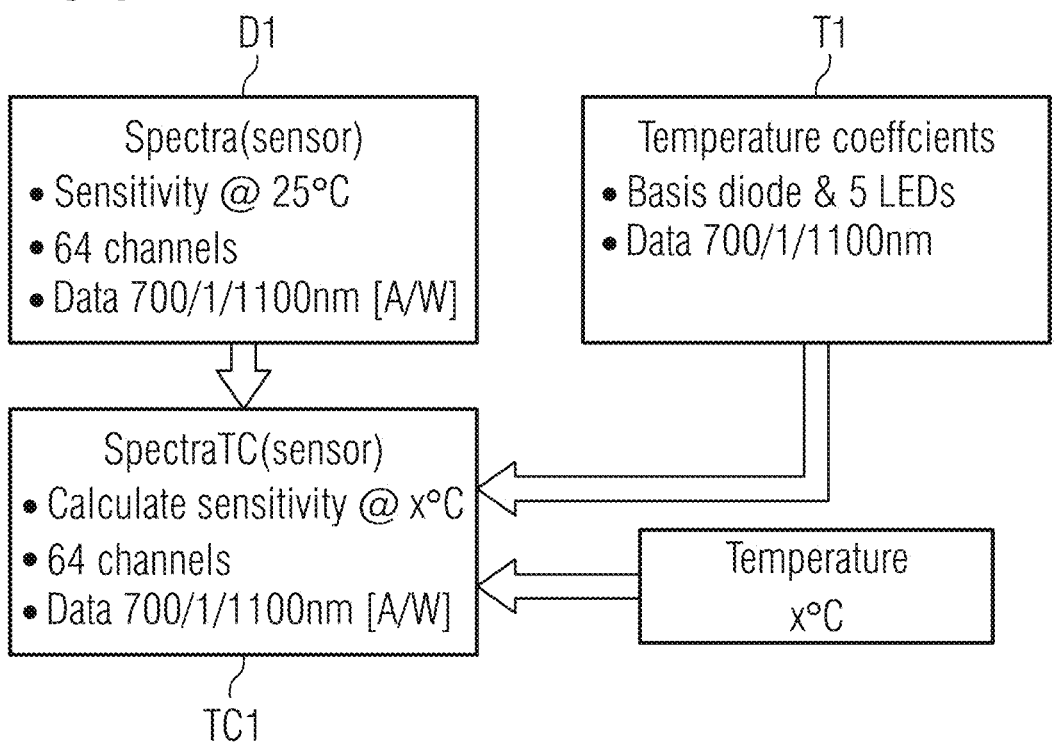

FIGS. 5A and 5B show an example process flow of channel temperature compensation. FIG. 5A depicts the data involved in the process and indicates the parameters defining the measurement condition under which the data has been measured.

In this example the sensor sensitivity $S_{Detector_{0,c}}(\lambda_j)$ (see reference numeral D1) has been recorded at a standard temperature of T=25° C. The optical sensor OS comprises c=64 channels. The data has been established with a resolution of 1 nm in a wavelength range of $\lambda_j=\lambda_1, \ldots, \lambda_j=700$ nm, . . . , 1100 nm. The corresponding first temperature coefficients T1 have been determined for a single channel, e.g. a single base photodiode. It is assumed that the coefficients apply to the remaining channels unchanged as these typically are of the same type. The data has been established with a resolution of 1 nm in a wavelength range of $\lambda_j=\lambda_1, \ldots, \lambda_j=700$ nm, . . . , 1100 nm.

The temperature coefficients indicate how the sensor sensitivity changes with temperature. Combining the sensor sensitivity data D1 with the temperature coefficients T1, e.g. by multiplication, yields a temperature compensated sensor sensitivity $S_{Detector_{x,c}}(\lambda_j)$. FIG. 5B depicts examples of actual data. The sensor sensitivity $S_{Detector_{0,c}}(\lambda_j)$ recorded for T=25° C. is shown on the upper left side. The first temperature coefficients T1 are shown for T=25° C. and T=80° C. on the upper right side. The resulting compensated sensor sensitivity $S_{Detector_{x=80° C,c}}(\lambda_j)$ (see reference numeral TC1) is shown at the bottom.

FIGS. 6A and 6B show an example process flow of emitter temperature compensation. FIG. 6A depicts the data involved in the process and indicates the parameters defining the measurement condition under which the data has been measured.

In this example the spectral radiance functions $E_{LED,0}(\lambda_j)$ (see reference numeral D2) has been recorded at a standard temperature of T=25° C. The array of optical emitters OE comprises five emitters OE. The data has been established with a resolution of 1 nm in a wavelength range of $\lambda_j=\lambda_1, \ldots, \lambda_j=700$ nm, . . . , 1100 nm. The corresponding second temperature coefficients T2 have been determined for all emitters OE individually. The data has been established with a resolution of 1 nm in a wavelength range of $\lambda_j=\lambda_1, \ldots, \lambda_j=700$ nm, . . . , 1100 nm.

The temperature coefficients T2 indicate how the spectral radiance functions change with temperature. Combining the spectral radiance functions with temperature coefficients, e.g. by multiplication, yields temperature compensated spectral radiance functions $E_{LED,x}(\lambda_j)$. FIG. 6B depicts examples of actual sensor data. The spectral radiance functions $E_{LED,0}(\lambda_j)$ recorded for T=25° C. are shown on the upper right side. The second temperature coefficients T2 are shown for T=25° C. and T=80° C. on the upper left side. The resulting compensated spectral radiance functions $E_{LED,x=80°\ C.}(\lambda_j)$ are shown at the bottom.

Figure 7B:
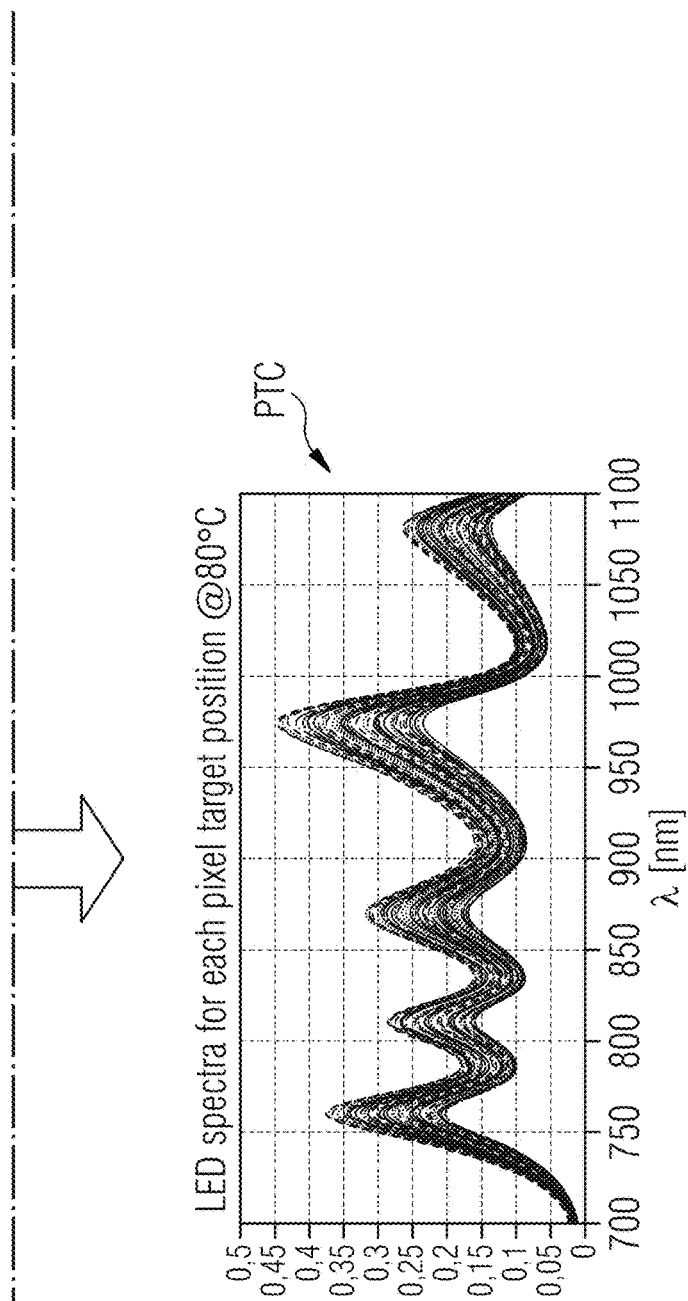

FIGS. 7A and 7B show an example process flow of weighting using a power distribution. FIG. 7A depicts the data involved in the process and indicates the parameters defining the measurement condition under which the data has been measured.

The temperature compensated spectral radiance functions $E_{LED,x}(\lambda_j)$ are further compensated using a relative power distribution P1 which results from illumination of the optical emitters OE at the target TG, e.g. a standard target, respectively. The power distribution P1 may be simulated or measured and is determined for each channel c. In terms of the mathematical framework introduced above, the power distribution is given by f(c), i.e. the power distribution factor of a given channel c to weight a contribution of an optical emitter OE to a detection at wavelength $\lambda_j$. The temperature compensated spectral radiance functions TC2 and power distribution factors are combined to yield the irradiance of the emitters $E_{x,c}(\lambda_j)$, respectively.

FIG. 7B depicts examples of actual data. The example considers five optical emitters OE (see reference numerals LED1 to LED5). The graphs PD1 to PD5 show an illuminated target area of the target TG. As discussed with respect to FIG. 2 the actual illumination may be affected by several parameters. In order to account for these influences the relative power distribution factors f(c) can be derived from the relative channel outputs of the optical sensor OS (denoted OUT1 to OUT5 on the left side of the drawing). For example, assume that LED1 illuminates the target area with determined, constant intensity. The numbers shown in graph OUT1 show an output of the respective channel due to reflection at the target, e.g. a standard target. Due to different illumination by the emitters OE the channels detect different intensities which are represented by different shades of grey and relative digit values in the drawing. The relative power distribution factors f(c) derive from these digit values, e.g. as percentage values. The graph on the right side is a different representation of the relative power distribution P1. $I_t$ shows how the spectra of a standard spectral source are recorded by each of the channels c of the optical sensor OS as a function of wavelength. The graph at the bottom shows the combined irradiance of the emitters $E_{x,c}(\lambda_j)$ for each channel c which is valid for the measured operating temperature.

Figure 8A:
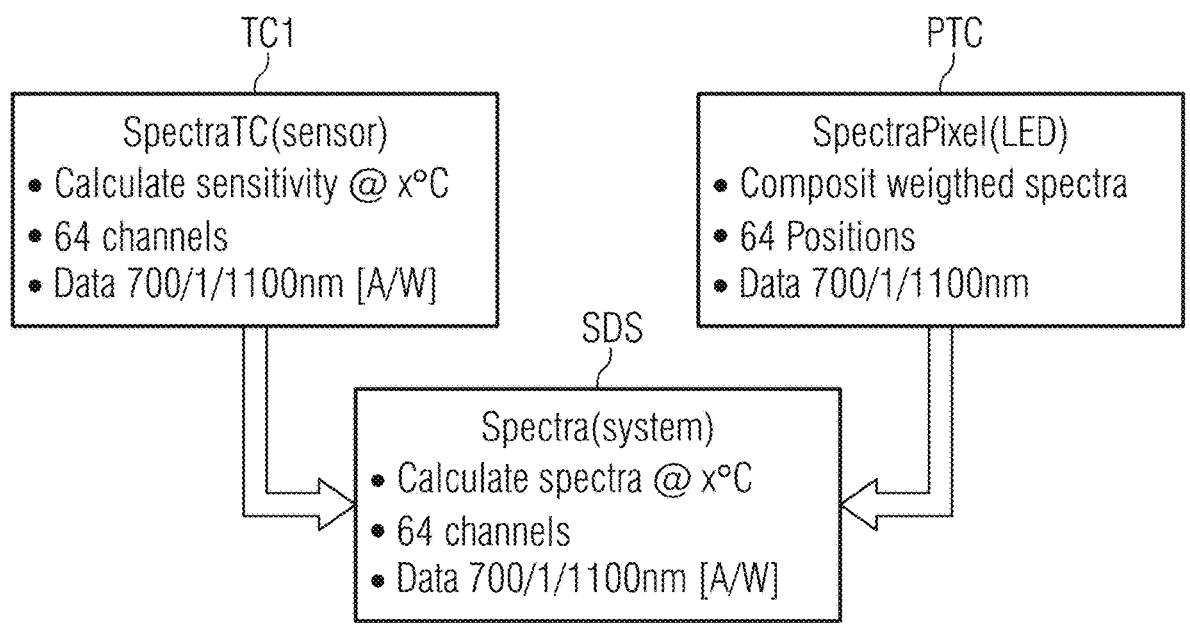
FIGS. 8A, 8B, show an example process flow of calculating a system detection matrix.
Figure 8B:
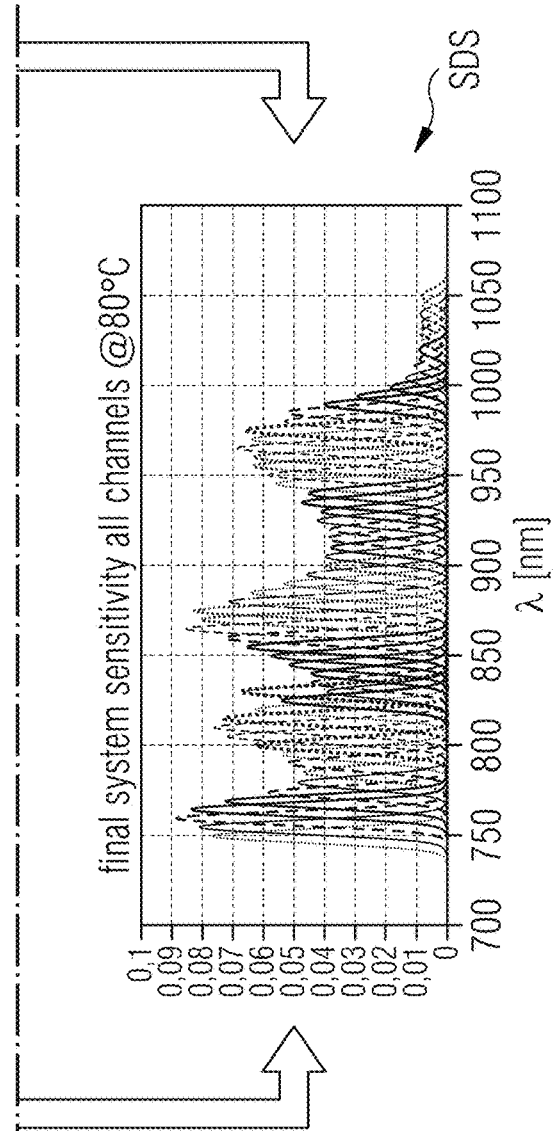
Figure 11:
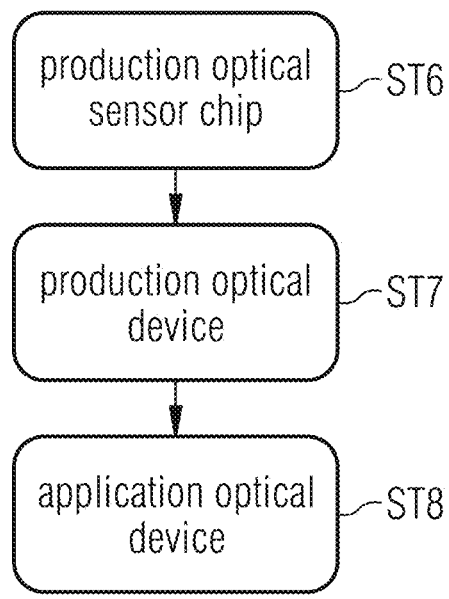
FIGS. 11 to 16 show example process flows of a method of operating an optical sensor device.

FIGS. 8A and 8B show an example process flow of calculating a system detection matrix. FIG. 9A depicts the data involved in the process and indicates the parameters defining the measurement condition under which the data has been measured. In this final stage the temperature compensated sensor sensitivity TC1 and the power distribution weighted temperature compensation irradiance PTC are combined to yield the system detection spectra SDS. In the mathematical framework derived above, the system detection spectra SDS represent the elements of the sensor sensitivity matrix $S_{DUT_x}$. The system detection matrix determines the calibration matrix which can be used to calibrate sensor output data into calibrated sensor output data. The system detection matrix and system detection spectra SDS are valid for the measured operating temperature. FIG. 9B depicts examples of actual data. The resulting temperature compensated sensor sensitivity TC1 from FIGS. 6A and 6B as well as power weighted irradiance of channels PTC are depicted. Combining these two contributions yields the system detection spectra SDS for all channels at the given operating temperature as shown in the bottom part of the drawing.

FIGS. 9A, 9B and 9C show example process flows of calculating a calibration matrix. The process flow depicted in 9A represents a construction of the calibration matrix from the provided sensor response data only. For example, the system detection spectra, represented by the sensor sensitivity matrix $S_{DUT_x}$ for operating temperature x, comprises information of 64 channels and data sets over a wavelength range spanning from 700 to 1100 nm in steps of 1 nm. According to the calibration algorithm introduced above the sensor sensitivity matrix $S_{DUT_x}$ corresponds to the system detection matrix SDM and a calibration matrix $M_x$ can be calculated as an inverse of the system detection matrix SDM. The calibration matrix CM and the system detection matrix SDM are valid for a given operating temperature at measurement condition x. The calibration matrix CM yield a 300×64 matrix in this example.

In other words, having determined the system detection spectra SDS for the current measurement condition (including the current operating temperature) the sensor sensitivity matrix $S_{DUT_x}$ can be determined and the sensor data can be calibrated using the calibration matrix $M_x$ calculated from the sensor sensitivity matrix. The calibration matrix $M_x$ is calculated for the same current measurement condition. The calibration matrix $M_x$ can be updated calculated regularly or when a changes of the measurement condition, e.g. a change in the current operating temperature, are detected.

FIG. 9B shows a complemented process flow of creating the calibration matrix. The calibration matrix $M_x$ calculated in FIG. 9A can be complemented with information measured by the customer (or manufacturer of the optical sensor device). For example, the optical sensor chip is embedded into an optical sensor device and additional reference data RD can be gathered at the production line of the optical sensor device. For example, a reference target, such as a white card, can be measured with the optical sensor device having the optical sensor chip embedded therein, i.e. this part of calibration is performed at the optical sensor device level. The additional calibration can proceed along the white target referencing discussed above. Thus, calibration involves fitting of linear coefficients a and b and calibrated sensor data is derived from a linear combination of calibration matrix $M_x$ and uncalibrated output matrix $Dig_{t,x}$ yielding a reference matrix RM. This reference data can be saved inside the optical sensor device and/or reference matrix RM can be used for compensation of deviations depending on optical adjustments in the final product, i.e. the optical sensor device.

FIG. 9C shows the complemented process flow of calculating the calibration matrix applied during a sample measurement. The calibration matrix derived in FIG. 9A using only the sensor response data or calibration matrix derived from reference data, as discussed above in FIG. 9B, can be used for measuring a sample by the final consumer using the assembled optical sensor device. The calibration matrix $M_x$ is continuously adjusted for the current operating temperature measured when the optical sensor device is in operation. Finally, the calibrated sensor output is derived from the calibration matrix $M_x$ valid for the given operating temperature.

For example, the calibrated sensor output may involves the linear coefficients a and b and sample sensor data SD.

The current operating temperature is measured and after temperature and power compensation the system detection matrix SDM is determined for the current operating temperature. After calculating the calibration matrix $M_x$ for this condition, the calibrated sensor output is determined from the sample sensor data SD and represented is sample matrix SM.

FIG. 10 shows additional means to further improve the calibration process flow. In a typical measurement and calibration as discussed this far, a measurement sequence providing the sensor response data proceeds along the concept discussed above. In a final calibration measurement, a reference sample at final test conditions after fabrication of the optical sensor device may be performed at the production line of the customer.

One possible solution to further improve accuracy of the calibration may be added if differences in temperature between reference measurement at fabrication and sample measurement in the application cannot be compensated well enough. Besides using a reference sample with known spectral reflection data to the user (reference target discussed above) the optical sensor may be modified to employ changes in power distribution at the target area due to changing distance.

The drawing shows an optical sensor OS similar to the one depicted in FIG. 7B. However, in addition a power distribution is recorded during operation of the optical sensor device which can be compared with the power distribution of known distance which is part of the sensor response data.

For example, the optical sensor OS comprises an array of pixels or channels as discussed in FIG. 2. At edges of the array E1 to E4 the pixels are configured to have a same spectral sensitivity, e.g. these pixels are associated with an optical filter OF having the same transmission characteristic. The relative power distribution factors f(c) can be derived from the relative channel outputs of the optical sensor OS using only the pixels at the edges (denoted OUT1 to OUT5 on the left side of the drawing). Similar to the process discussed in FIG. 7B the relative power distribution factors f(c) are determined.

This way two power distributions are considered: a first power distribution with a first set of relative power distribution factors f(c) (see reference numeral PD1) from the sensor response data (e.g. at a reference distance) and a second power distribution with a second set of relative power distribution factors f(c) (see reference numeral PD2) measured at a current distance. The differences in elative power distribution factors f(c) can be evaluated and used to compensate the sensor sensitivity matrix by using the actual power distribution at a current distance. From this point on, calculation may proceed as discussed in the figures above. Distance can be determined by means of a time-of-flight sensor which may be part of the optical sensor device. Furthermore, the optical sensor chip can be configured as a time-of-flight sensor in order to provide distance measurement using the same chip. Furthermore, measurement if power distribution during operation also accounts for changes in operating temperature as the power distribution typically also depends on temperature (see graph PD3 in the inset of the drawing).

FIGS. 11 to 16 show example process flows of a method of operating an optical sensor device. The optical sensor chip passes different stages including the production of the optical sensor chip (stage ST6), production of the optical device (stage ST7) and finally the application of the optical device (stage ST8).

Figure 12:
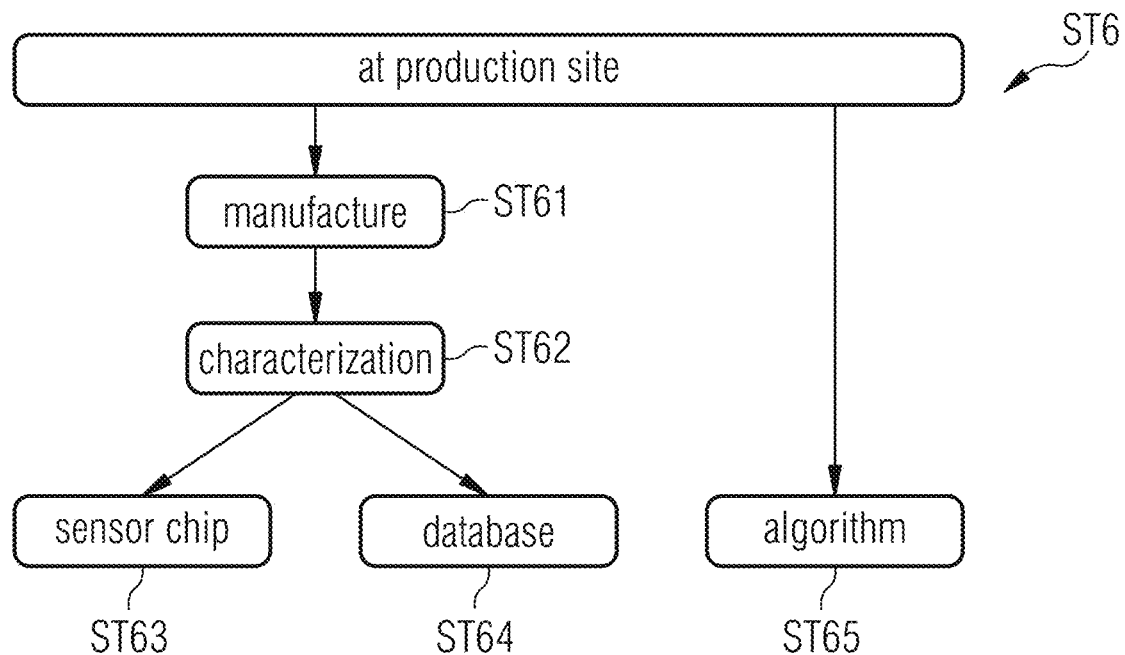
Figure 13:
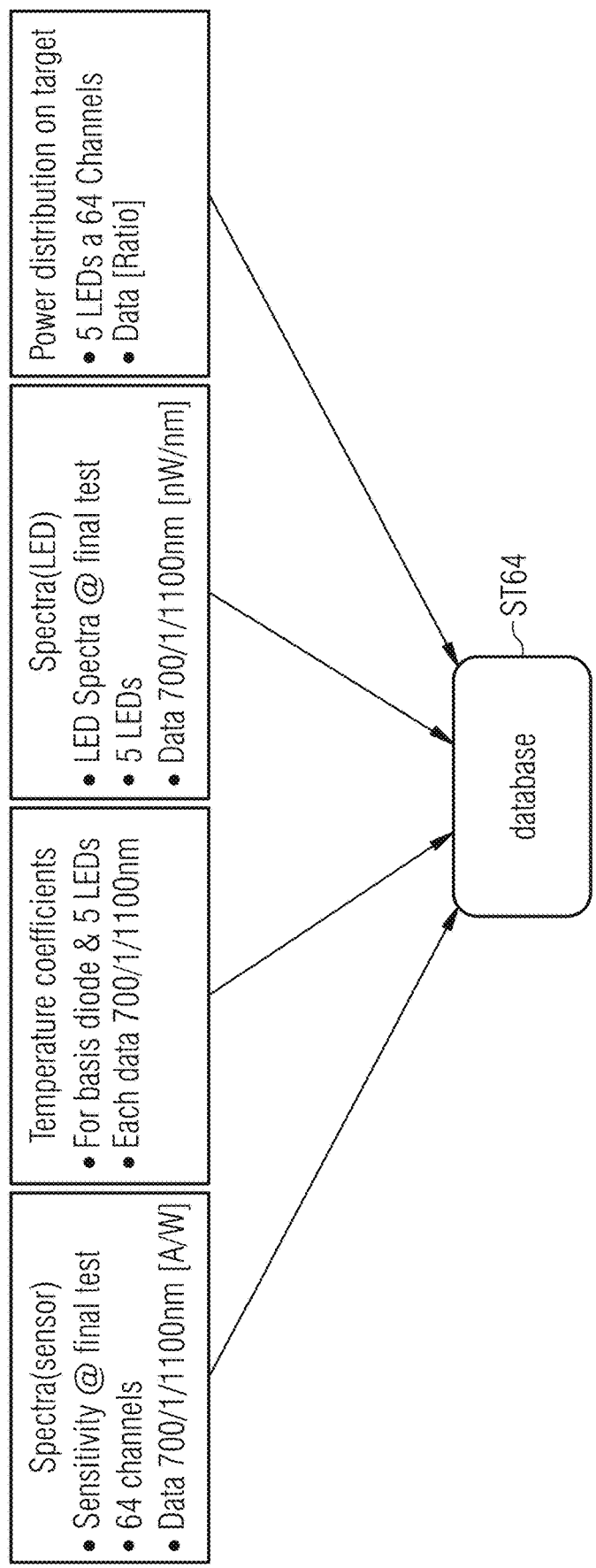

In stage ST6 at the production site the optical sensor chip several further stages ST61 to ST65 are performed (see FIG. 12). First, the optical sensor chip is manufactured (ST61) and characterized (ST62). As discussed above this involves recording of individual sensor response data at the production site. The characterization involves testing the optical sensor chip and referencing the chip with an unambiguous chip ID (ST63). The recorded sensor response data is saved in a database (ST64) referenced with the chip ID (see FIG. 13). Furthermore, the calibration algorithm (ST65) is associated with the chip ID and also saved in the database.

Figure 14:
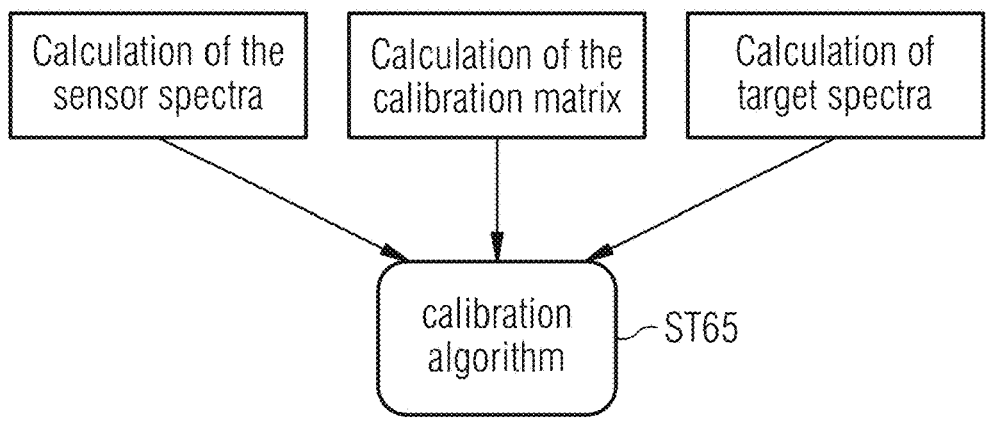
Figure 15:
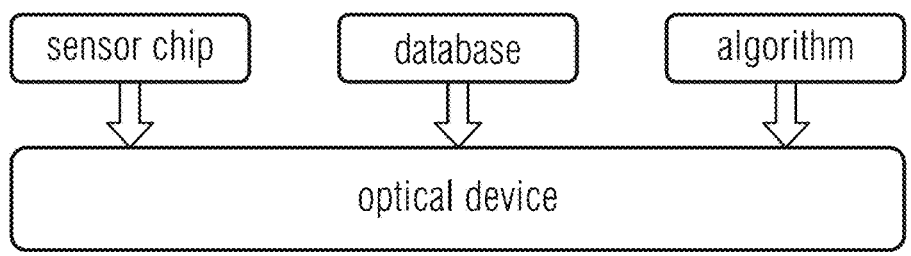
Figure 16:
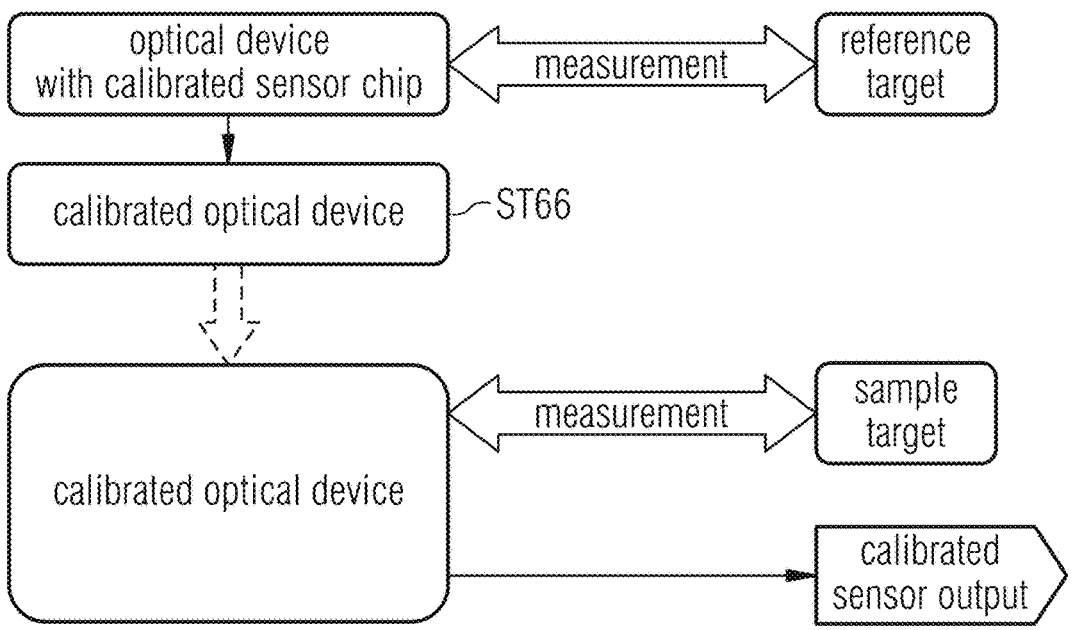

Calculation of the sensor spectra, of the calibration matrix and of the target spectra, i.e. calibrated sensor output are determined by the calibration algorithm (see FIG. 14). These steps are performed with the optical sensor chip already assembled into the optical sensor device. In order to perform the calibration with the tested optical sensor chip the chip ID, the databank entry including the chip ID and sensor response data as well as the algorithm are provided to the customer (see FIG. 15). The optical sensor chip is integrated into the optical device at stage ST7. The data and algorithm can be saved on the optical device at a production line of the customer.

Furthermore, the optical sensor device having the calibrated sensor chip can measure a reference target and provide a calibrated sensor output as discussed above. These steps result in a calibrated optical device (see ST66) comprising a system detection function and calibration matrix for the current measurement condition x. The calibrated optical device is prepared to measure a sample target and output a calibrated sensor output. Changing operating temperatures are accounted for by means of executing the calibration algorithm again to determine a new system detection function and calibration matrix for the new measurement condition x.

The invention claimed is:

1. A method of characterizing an optical sensor chip, comprising:
   providing an optical sensor chip, comprising:
      one or more optical detector elements, channels, and
      one or more optical emitter elements, emitters;
   providing an unambiguous chip identification number, chip ID;
   providing an electronic database;
   referencing the optical sensor chip with the unambiguous chip ID;
   characterizing the optical sensor chip by measuring sensor response data as a function of wavelength and an operating temperature in a defined or standard environment, wherein measuring the sensor response data comprises:
   recording, at a reference temperature Tref, a sensor sensitivity matrix indicating a sensor sensitivity of a given channel as a function of wavelength, respectively;
   recording a first set of temperature coefficients for at least one channel, indicating the sensor sensitivity for the at least one channel as a function of wavelength and operating temperature;
   recording, at the reference temperature Tref, a spectral irradiance function indicating an emission characteristic of a given emitter as a function of wavelength, respectively; and
   recording a second set of temperature coefficients for at least one emitter indicating the emission characteristic for the at least one emitter as a function of wavelength and operating temperature;

saving the sensor response data together with the chip ID as a data bank entry in an electronic database; and
providing a calibration algorithm associated with the chip ID.

2. The method according to claim 1, wherein measuring the sensor response data further comprises recording a power distribution function of the one or more emitters,
indicating a relative power distribution at a reference target which is located at a reference position, or
indicating a relative power distribution at a reference target as a function of several reference positions.

3. A method of calibrating an optical sensor chip, the method comprising:
integrating the optical sensor chip into an optical sensor device, wherein the optical sensor chip comprises one or more optical detector elements, channels, and one or more optical emitter elements, emitters; and wherein the optical sensor chip is configured to be identified by an
unambiguous chip identification number, chip ID;
retrieving sensor response data using the chip ID from a database, in which the sensor response data is provided together with the chip ID as a data bank entry, the sensor response data comprising a sensor sensitivity of the respective channels and an emission characteristic of the optical emitters, as a function of wavelength and operating temperature, respectively;
providing a calibration algorithm associated with the chip ID;
measuring an operating temperature of the optical sensor device;
measuring a sensor output of the optical sensor chip at the measured operating temperature; and
calibrating the sensor output using the retrieved sensor response data, the calibration algorithm and the operating temperature.

4. The method according to claim 3, further comprising:
calculating for a measurement condition x and the operating temperature a system detection matrix from the retrieved sensor response data according to the calibration algorithm;
determining a calibration matrix from the system detection matrix; and
calibrating the sensor output using the calibration matrix.

5. The method according to claim 4, wherein a reference target of known optical properties is used to determine linear coefficients such that the calibrated sensor output is determined by a linear combination of the system detection matrix and the calibration matrix.

6. The method according to claim 3, wherein the operating temperature is repeatedly measured, and the sensor output is calibrated for each measured operating temperature.

7. The method according to claim 3, wherein calibrating the sensor output comprises:
compensating a sensor sensitivity matrix for the operating temperature using a coefficient from a first set of temperature coefficients, the temperature coefficients indicating a sensor sensitivity for the at least one channel as a function of wavelength and operating temperature; and wherein:
the sensor response data comprises the sensor sensitivity matrix which indicates a sensor sensitivity of a given channel as a function of wavelength at a reference temperature Tref, respectively.

8. The method according to claim 3, wherein calibrating the sensor output comprises:
compensating a spectral irradiance function for the operating temperature using a coefficient from a second set of temperature coefficients, the temperature coefficients indicating for at least one emitter an emission characteristic as a function of wavelength and operating temperature, respectively; and wherein:
the sensor response data comprises the spectral irradiance function indicating the emission characteristic of a given emitter as a function of wavelength at a reference temperature Tref, respectively.

9. The method according to claim 8, wherein calibrating the sensor output further comprises:
weighting the temperature compensated spectral irradiance function with a power distribution function of the one or more emitters, and wherein the power distribution function indicates:
a relative power distribution at a reference target which is located at a reference position or
a relative power distribution at a reference target as a function of several reference positions.

10. A method of operating an optical sensor device, comprising:
characterizing an optical sensor chip according to claim 1,
calibrating the optical sensor chip by
providing an unambiguous chip identification number, chip ID, to identify the optical sensor chip,
retrieving sensor response data using the chip ID, wherein the sensor response data is saved together with the chip ID as a data bank entry in a database, and wherein the sensor response data is a function of wavelength and operating temperature,
providing a calibration algorithm associated with the chip ID,
measuring an operating temperature of the optical sensor device, and
measuring a sensor output of the optical sensor chip at the measured operating temperature, and
calibrating the sensor output using the retrieved sensor response data, the calibration algorithm and the operating temperature, and
measuring a calibrated sensor output.

11. An optical sensor device, comprising:
a host system;
a temperature sensor to a measure an operating temperature of the optical sensor device;
an optical sensor chip referenced with an unambiguous chip identification number, chip ID;
a memory to save sensor response data and a calibration algorithm associated with the chip ID; and
a processing unit to access the memory using the chip ID and to process a calibration of a sensor output of the optical sensor chip using the calibration algorithm, the sensor response data and the operating temperature,
wherein the optical sensor chip comprises one or more optical detector elements, channels, and one or more optical emitter elements, emitters, and
wherein the sensor response data comprises a sensor sensitivity of the respective channels and an emission characteristic of the optical emitters as a function of wavelength an operating temperature,
wherein the optical sensor chip is characterized by measuring sensor response data as a function of wavelength and an operating temperature in a defined or standard environment, wherein the sensor response data is measured by recording, at a reference temperature Tref, a sensor sensitivity matrix indicating a sensor sensitivity of a given channel as a function of wavelength, respectively, recording a first set of temperature coefficients for at least one channel, indicating the sensor sensitivity for the at least one channel as a function of wavelength and operating temperature, recording, at the reference temperature Tref, a spectral irradiance function indicating an emission characteristic of a given emitter as a function of wavelength, respectively, and recording a second set of temperature coefficients for at least one emitter indicating the emission characteristic for the at least one emitter as a function of wavelength and operating temperature.

12. The optical sensor device according to claim 11, wherein the memory comprises:
   an interface to input the sensor response data and the calibration algorithm; and/or
   a communication unit to access the database remotely to retrieve, using the chip ID, the sensor response data and the calibration algorithm associated with the chip ID.

13. A calibration system, comprising:
   a chip calibration setup located at a production line of the optical sensor chip, arranged to perform characterization of the optical sensor chip according to claim 1, and
   a device calibration setup located at the production line of the optical sensor device comprising the optical sensor chip, arranged to perform a calibration of the optical sensor device by
      providing an unambiguous chip identification number, chip ID, to identify the optical sensor chip,
      retrieving sensor response data using the chip ID, wherein the sensor response data is saved together with the chip ID as a data bank entry in a database, and wherein the sensor response data is a function of wavelength and operating temperature,
      providing a calibration algorithm associated with the chip ID,
      measuring an operating temperature of the optical sensor device, and
      measuring a sensor output of the optical sensor chip at the measured operating temperature, and
      calibrating the sensor output using the retrieved sensor response data, the calibration algorithm and the operating temperature.

* * * * *